US012775937B2

(12) United States Patent
Shrestha et al.

(10) Patent No.: US 12,775,937 B2

(45) Date of Patent: Oct. 27, 2026

(54) SECURE ACCESS TO AN ONLINE SERVICE BASED ON A TOKEN EXCHANGE

(71) Applicant: Lowe's Companies, Inc., Mooresville, NC (US)

(72) Inventors: Manij Shrestha, Weddington, NC (US); Gaurav Dixit, Indian Land, SC (US); Venkat Ambati, Austin, TX (US); Kevin Howell, Huntersville, NC (US); Siddharth Singh, Eagan, MN (US)

(73) Assignee: Lowe's Companies, Inc., Mooresville, NC (US)

( * ) Notice: Subject to any disclaimer, the term of this patent is extended or adjusted under 35 U.S.C. 154(b) by 196 days.

(21) Appl. No.: 18/150,704

(22) Filed: Jan. 5, 2023

(65) Prior Publication Data

US 2024/0232313 A1 Jul. 11, 2024

(51) Int. Cl.

*G06Q 20/38* (2012.01)
*G06Q 20/20* (2012.01)
*G06Q 20/40* (2012.01)

(52) U.S. Cl.

CPC ......... *G06Q 20/3821* (2013.01); *G06Q 20/20* (2013.01); *G06Q 20/405* (2013.01)

(58) Field of Classification Search

None

See application file for complete search history.

(56) References Cited

U.S. PATENT DOCUMENTS 6,343,361 B1 * 1/2002 Nendell .............. H04L 63/0428 380/278
6,839,690 B1 1/2005 Ryan et al.
(Continued)

FOREIGN PATENT DOCUMENTS

CA 3093945 A1 * 3/2021 ......... G06Q 30/0279
CA 2837208 C * 8/2022 ......... G06Q 20/4097
(Continued)

OTHER PUBLICATIONS

X. Zhang, H. Zeng and X. Zhang, "Mobile payment protocol based on dynamic mobile phone token," 2017 IEEE 9th International Conference on Communication Software and Networks (ICCSN), Guangzhou, China. https://ieeexplore.ieee.org/document/8230198?source=IQplus (Year: 2017).*
(Continued)

*Primary Examiner* — El Mehdi Oussir

(74) *Attorney, Agent, or Firm* — Kilpatrick Townsend & Stockton LLP

(57) ABSTRACT

Techniques are described herein for a secure access to an online service based on a token exchange. In an example, a first user interface associated with a first user account is presented on a first user device and is used to indicate a set of restrictions associated with use of a function of the online service by the first user account. A security credential can be generated and associated with the set of restrictions. Upon receiving the security credential from a second user device from which a login to the first user account has not occurred, a determination can be made that the function is accessible to the second user device. This access can use the first user account subject to the restrictions. A token associated with the set of restrictions and the function can be sent to the second user device to enable the use of the function.

17 Claims, 14 Drawing Sheets

(56) References Cited

U.S. PATENT DOCUMENTS

| | | | | |
|---|---|---|---|---|
| 7,146,342 | B1 | 12/2006 | Allfred et al. | |
| 7,249,097 | B2 | 7/2007 | Birch et al. | |
| 7,478,054 | B1 | 1/2009 | Jocobi et al. | |
| 7,707,113 | B1 | 4/2010 | Zhu et al. | |
| 7,949,572 | B2 | 5/2011 | Crespo et al. | |
| 7,958,529 | B2 | 6/2011 | Evans et al. | |
| 8,165,961 | B1 | 4/2012 | Zhu et al. | |
| 8,336,091 | B2 * | 12/2012 | Wong | H04L 63/08 726/5 |
| 8,442,868 | B2 | 5/2013 | Nicolaidis et al. | |
| 8,706,628 | B2 | 4/2014 | Phillips | |
| 8,959,599 | B2 * | 2/2015 | Mohler | H04L 9/32 726/5 |
| 9,154,482 | B2 * | 10/2015 | Dudziak | H04L 63/08 |
| 9,246,896 | B2 * | 1/2016 | Yasuhara | H04L 63/08 |
| 9,306,926 | B2 * | 4/2016 | Truong | G06Q 50/01 |
| 9,324,080 | B2 | 4/2016 | Lu et al. | |
| 9,330,389 | B2 | 5/2016 | Pitroda et al. | |
| 9,390,413 | B2 | 7/2016 | Castell et al. | |
| 9,489,673 | B2 | 11/2016 | Portal et al. | |
| 9,558,481 | B2 | 1/2017 | McMillen et al. | |
| 9,558,494 | B2 | 1/2017 | Pezold et al. | |
| 9,607,293 | B2 | 3/2017 | McMillen et al. | |
| 9,721,285 | B2 | 8/2017 | Brown et al. | |
| 9,818,093 | B1 | 11/2017 | Grier | |
| 9,923,879 | B1 * | 3/2018 | Ziraknejad | H04L 63/107 |
| 9,953,311 | B2 | 4/2018 | Makhotin et al. | |
| 9,978,062 | B2 | 5/2018 | Laxminarayanan et al. | |
| 10,032,164 | B2 | 7/2018 | Nahari | |
| 10,055,725 | B2 | 8/2018 | Sprecher | |
| 10,200,359 | B1 * | 2/2019 | Sokolov | H04L 63/0853 |
| 10,592,874 | B1 | 3/2020 | Nayfack | |
| 10,600,046 | B2 | 3/2020 | Pan et al. | |
| 10,657,531 | B1 * | 5/2020 | Arumugam | G06Q 10/063 |
| 10,769,613 | B1 * | 9/2020 | Bharghavan | G06Q 20/409 |
| 10,785,021 | B1 * | 9/2020 | Prabhat | H04L 9/0863 |
| 10,853,776 | B1 | 12/2020 | Grier | |
| 10,929,841 | B1 | 2/2021 | Kalaboukis et al. | |
| 11,010,753 | B2 | 5/2021 | Kalgi | |
| 11,257,085 | B1 * | 2/2022 | Barkas | G06Q 20/3829 |
| 11,296,885 | B2 | 4/2022 | Baskette et al. | |
| 11,308,487 | B1 * | 4/2022 | Foster | G06Q 20/3829 |
| 11,403,686 | B1 | 8/2022 | Kalaboukis et al. | |
| 11,461,766 | B1 | 10/2022 | Puffer et al. | |
| 11,468,414 | B1 | 10/2022 | Sprague et al. | |
| 11,615,180 | B2 * | 3/2023 | Sholtis | G06F 21/45 726/4 |
| 11,968,216 | B1 * | 4/2024 | Russell | H04L 63/0853 |
| 12,126,648 | B2 * | 10/2024 | Wang | G06Q 20/223 |
| 12,141,266 | B2 * | 11/2024 | Chester | H04L 63/102 |
| 12,141,871 | B1 * | 11/2024 | James | G06Q 20/065 |
| 12,160,515 | B2 * | 12/2024 | Ferenczi | H04L 63/0823 |
| 12,309,151 | B2 * | 5/2025 | Ju | G06F 21/45 |
| 12,602,684 | B2 * | 4/2026 | Faruqui | G06Q 20/3821 |
| 2002/0004766 | A1 | 1/2002 | White | |
| 2002/0123938 | A1 | 9/2002 | Willner et al. | |
| 2003/0009388 | A1 | 1/2003 | Simonyi-Gindele | |
| 2003/0135420 | A1 | 7/2003 | Culling et al. | |
| 2010/0010912 | A1 | 1/2010 | Jones et al. | |
| 2012/0197794 | A1 | 8/2012 | Jones et al. | |
| 2012/0296741 | A1 | 11/2012 | Dykes | |
| 2014/0074637 | A1 * | 3/2014 | Hammad | G06Q 20/326 705/41 |
| 2014/0149160 | A1 * | 5/2014 | Argue | G06Q 10/0631 705/7.13 |
| 2014/0279499 | A1 * | 9/2014 | Kane | G06Q 20/3274 705/44 |
| 2015/0088741 | A1 * | 3/2015 | Lyman | G06Q 20/322 705/44 |
| 2015/0237026 | A1 * | 8/2015 | Kumar | G06Q 20/4012 726/28 |
| 2015/0254699 | A1 * | 9/2015 | Bondesen | G06Q 20/20 705/14.17 |
| 2016/0253651 | A1 * | 9/2016 | Park | G06Q 20/34 705/39 |
| 2016/0261425 | A1 * | 9/2016 | Horton | H04L 67/535 |
| 2016/0275512 | A1 * | 9/2016 | Bondesen | G06Q 20/385 |
| 2016/0277380 | A1 * | 9/2016 | Wagner | H04W 12/069 |
| 2017/0011395 | A1 * | 1/2017 | Pillai | G06Q 20/40 |
| 2017/0032369 | A1 * | 2/2017 | Hugot | G06Q 20/3825 |
| 2017/0091765 | A1 * | 3/2017 | Lloyd | G06Q 20/321 |
| 2017/0103388 | A1 * | 4/2017 | Pillai | G06Q 20/3823 |
| 2017/0185998 | A1 | 6/2017 | Jung | |
| 2017/0193484 | A1 | 7/2017 | Weis et al. | |
| 2017/0206528 | A1 * | 7/2017 | Han | G06Q 20/382 |
| 2018/0330369 | A1 | 11/2018 | Warner | |
| 2019/0026456 | A1 * | 1/2019 | Hon | G06F 21/40 |
| 2019/0026738 | A1 | 1/2019 | Robeen et al. | |
| 2019/0386984 | A1 * | 12/2019 | Thakkar | H04L 63/18 |
| 2020/0090168 | A1 * | 3/2020 | Mossler | G06F 21/31 |
| 2020/0098026 | A1 | 3/2020 | Hummel Alon | |
| 2020/0111081 | A1 * | 4/2020 | Kallugudde | G06Q 20/3672 |
| 2020/0210997 | A1 * | 7/2020 | Sarin | G06Q 20/223 |
| 2020/0211016 | A1 * | 7/2020 | Ju | G06Q 40/02 |
| 2020/0387887 | A1 * | 12/2020 | Rathod | G06Q 20/3224 |
| 2020/0387892 | A1 * | 12/2020 | Asefi | G06Q 20/3223 |
| 2021/0073810 | A1 | 3/2021 | Gramling | |
| 2021/0194691 | A1 * | 6/2021 | Mars | H04L 9/0894 |
| 2021/0266312 | A1 * | 8/2021 | Hong | G06Q 20/3226 |
| 2021/0328990 | A1 * | 10/2021 | Ju | G06Q 20/40145 |
| 2021/0344674 | A1 * | 11/2021 | Chen | H04L 9/3231 |
| 2021/0390546 | A1 * | 12/2021 | Deignan | G06Q 20/409 |
| 2022/0123950 | A1 * | 4/2022 | Erickson | G06F 9/5072 |
| 2022/0124078 | A1 * | 4/2022 | Erickson | H04L 9/0894 |
| 2022/0207527 | A1 * | 6/2022 | Surin | H04L 9/3213 |
| 2022/0237591 | A1 * | 7/2022 | Omojola | G06Q 20/42 |
| 2022/0391883 | A1 * | 12/2022 | Ortiz | G06Q 20/023 |
| 2023/0015697 | A1 * | 1/2023 | Krishnan | H04L 67/563 |
| 2023/0281625 | A1 * | 9/2023 | Mardikar | G06Q 20/401 705/64 |
| 2023/0334503 | A1 * | 10/2023 | Osborn | G06Q 20/40975 |
| 2024/0104532 | A1 * | 3/2024 | Scholl | G06Q 20/30 |
| 2024/0296218 | A1 * | 9/2024 | Chen | G06F 21/45 |
| 2026/0113195 | A1 * | 4/2026 | Chakraborti | H04L 9/3213 |

FOREIGN PATENT DOCUMENTS

| | | | | | |
|---|---|---|---|---|---|
| CA | 2912066 | C | * | 4/2024 | |
| CN | 107210918 | A | * | 9/2017 | G06Q 20/3224 |
| CN | 109840776 | A | * | 6/2019 | |
| CN | 105960776 | B | * | 4/2020 | G06Q 20/3278 |
| CN | 111819555 | A | * | 10/2020 | G06Q 20/3829 |
| CN | 110502887 | B | * | 7/2023 | G06F 21/33 |
| RU | 2016105772 | A | * | 8/2017 | G06Q 20/40 |
| WO | WO-2018140272 | A1 | * | 8/2018 | G06Q 20/42 |
| WO | WO-2022211840 | A1 | * | 10/2022 | G06Q 20/10 |
| WO | WO-2024073266 | A1 | * | 4/2024 | |
| WO | WO-2024220433 | A1 | * | 10/2024 | G06N 20/00 |

OTHER PUBLICATIONS

P. Urien, M. Pasquet and C. Kiennert, "A breakthrough for prepaid payment: End to end token exchange and management using secure SSL channels created by EAP-TLS smart cards," Philadelphia, PA, USA. https://ieeexplore.ieee.org/document/5928726?source=IQplus (Year: 2011).*

W. Liu, X. Wang and W. Peng, "State of the Art: Secure Mobile Payment," in IEEE Access, vol. 8, pp. 13898-13914, 2020, doi: 10.1109/ACCESS.2019. https://ieeexplore.ieee.org/document/8947955?source=IQplus (Year: 2019).*

A. S. Munalih, A. Goh, Hoon Sin Cheong, Kay Win Lee and Kang Siong Ng, "Transaction signing on multiple channels," 2017 International Conference on Advances in Computing, Communications and Informatics (ICACCI), Udupi, India, 2017. https://ieeexplore.ieee.org/document/8126016?source=IQplus (Year: 2017).*

A. Hakami and A. Al-Omary, "Secure Transaction Framework based on Encrypted One-time Password and Multi-factor," 2021 International Conference on Data Analytics for Business and Industry (ICDABI), Sakheer, Bahrain, 2021. https://ieeexplore.ieee.org/document/9655840?source=IQplus (Year: 2021).*

(56) References Cited

OTHER PUBLICATIONS

An IP.com Prior Art Database Technical Disclosure. Sharing of Limited Use Credit Authorization Codes on Mobile Devices. Jan. 15, 2016. https://priorart.ip.com/IPCOM/000244787 (Year: 2016).*
W. Liu, X. Wang and W. Peng, "State of the Art: Secure Mobile Payment," in IEEE Access, vol. 8, pp. 13898-13914, 2020, https://ieeexplore.ieee.org/document/8947955?source=IQplus (Year: 2019).*
G. Violaris and I. Dionysiou, "Out-of-Band Authentication Model with Hashcash Brute-Force Prevention," 2014 IEEE Intl Conf on High Performance Computing and Communications, 2014 IEEE 6th Intl Symp on Cyberspace Safety and Security, Paris. https:// ieeexplore.ieee.org/document/7056834?source=IQplus (Year: 2014).*
Y.-S. Jeong, N. Sun and S.-H. Lee, "IPTV Micropayment System Based on Hash Chain Using RFID-USB Module," 2010 IEEE 34th Annual Computer Software and Applications Conference, Seoul, Korea (South), 2010, https://ieeexplore.ieee.org/document/5676255?source=IQplus (Year: 2010).*
Chang, Bao-Rong, Hsiu Fen Tsai, and Hsia-Chung Huang. "Implementation of Smart Mobile Point-of-Sale Cash Register System." J. Netw. Intell. 3.3 (2018):170-188.
Jensen, Oliver Christopher. Secure protocols for contactless credit cards andelectronic wallets. Diss. 2017.
Basili, Alessandra, Walter Liguori, and Federica Palumbo. "NFC smart touristcard: Combining mobile and contactless technologies towards a smart touristexperience." 2014 IEEE 23rd International WETICE Conference. IEEE, 2014.
Susanna, A., et al. "Enhancing user authentication for mobile wallet usingcryptographic algorithm." J. Adv. Res. Dyn. Control Syst 10 (2018): 891-897.

* cited by examiner

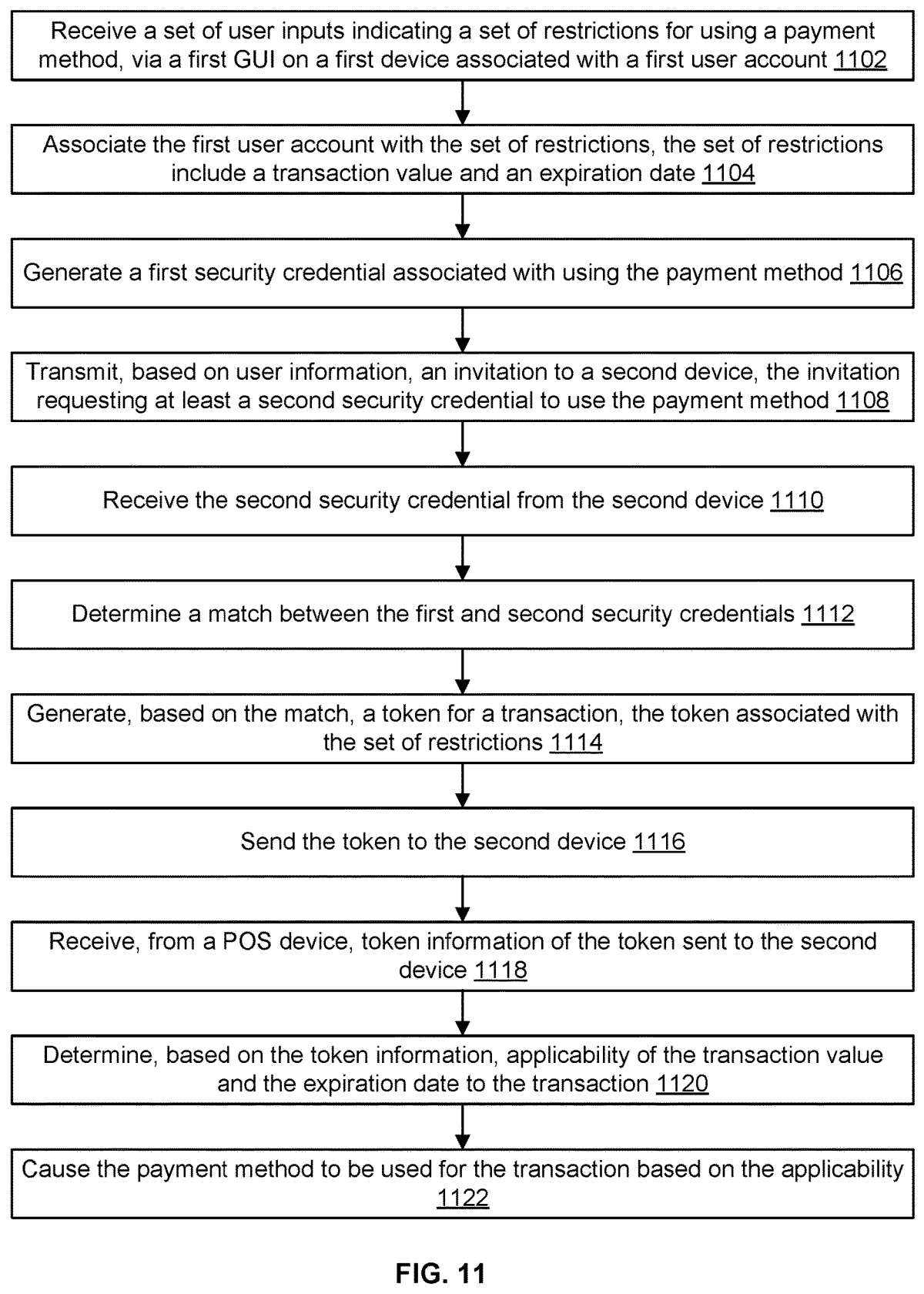

Receive a set of user inputs indicating a set of restrictions for using a payment method, via a first GUI on a first device associated with a first user account 1102

↓

Associate the first user account with the set of restrictions, the set of restrictions include a transaction value and an expiration date 1104

↓

Generate a first security credential associated with using the payment method 1106

↓

Transmit, based on user information, an invitation to a second device, the invitation requesting at least a second security credential to use the payment method 1108

↓

Receive the second security credential from the second device 1110

↓

Determine a match between the first and second security credentials 1112

↓

Generate, based on the match, a token for a transaction, the token associated with the set of restrictions 1114

↓

Send the token to the second device 1116

↓

Receive, from a POS device, token information of the token sent to the second device 1118

↓

Determine, based on the token information, applicability of the transaction value and the expiration date to the transaction 1120

↓

Cause the payment method to be used for the transaction based on the applicability 1122

FIG. 11

SECURE ACCESS TO AN ONLINE SERVICE BASED ON A TOKEN EXCHANGE

BACKGROUND OF THE INVENTION

Computer networks can be implemented using various architectures to provide online services. In an example, a client-server architecture can be used. In particular, a server executes program code to provide an online service. A client device can present a user interface for accessing the online service. The access can require a user account, such that the online service can become available after a correct user authentication via a user account login.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In an example, techniques are described and can involve a method implemented by a system having one or more non-transitory computer readable storage media storing instructions for implementing operations of the method. The techniques can include receiving a set of user inputs via a first graphical user interface (GUI) on a first device associated with a first user account, the set of user inputs indicating a set of restrictions for using a payment method associated with the first user account, the set of restrictions including user information, a transaction value, and an expiration date; associating the first user account with the set of restrictions; generating a first security credential associated with using the payment method; transmitting, based on the user information, an invitation to a second device, the invitation requesting at least a second security credential to use the payment method; receiving the second security credential from the second device; determining a match between the first security credential and the second security credential; generating, based on the match, a token for a transaction, the token associated with the set of restrictions; sending the token to the second device; receiving, from a point of sale (POS) device, token information of the token sent to the second device; determining, based on the token information, applicability of the transaction value and the expiration date to the transaction; and causing the payment method to be used for the transaction based on the applicability of the transaction value and the expiration date to the transaction.

In an example, the first GUI is presented on the first device based on an execution of a first instance of a first application. In this example, the techniques can also include determining, based on the user information, a second user account; and determining the second device based on the second user account, the invitation is sent as a link displayable by a messaging application of the second device or by a second instance of the first application executing on the second device.

In an example, the invitation is presented on a second GUI on the second device, and the second security credential is received via the second GUI. In this example, the first security credential can be sent to the first device and is presented via the first GUI. Further, the first security credential can be expirable, and the second security credential can be the same as the first security credential and can be received prior to expiration of the first security credential.

In an example, the first GUI includes a field for inputting or selecting the user information, a second field for inputting the transaction value, and a third field for inputting the expiration date.

In an example, the set of restrictions further indicate whether the transaction value is usable for multiple transactions or not. Each transaction corresponds to a scan of the token by the POS device upon a presentation of the token via one or more GUIs.

In an example, the token information is received based on proximity of the second device to the POS device. In this example, the token information can include one or more links to the first user account and the set of restrictions.

In an example, the techniques further include determining, based on the token information, user account data associated with the first user account; and causing a display device associated with the POS device to present the user account data.

For a fuller understanding of the nature and advantages of the present invention, reference should be made to the ensuing detailed description and accompanying drawings.

BRIEF DESCRIPTION OF THE DRAWINGS

Various embodiments in accordance with the present disclosure will be described with reference to the drawings, in which:

FIG. 11 illustrates an example of a flow for enabling a second user device to interact with a POS device based on restrictions defined via a first user device in accordance with at least some embodiments;

DETAILED DESCRIPTION OF THE INVENTION

Figure 1:
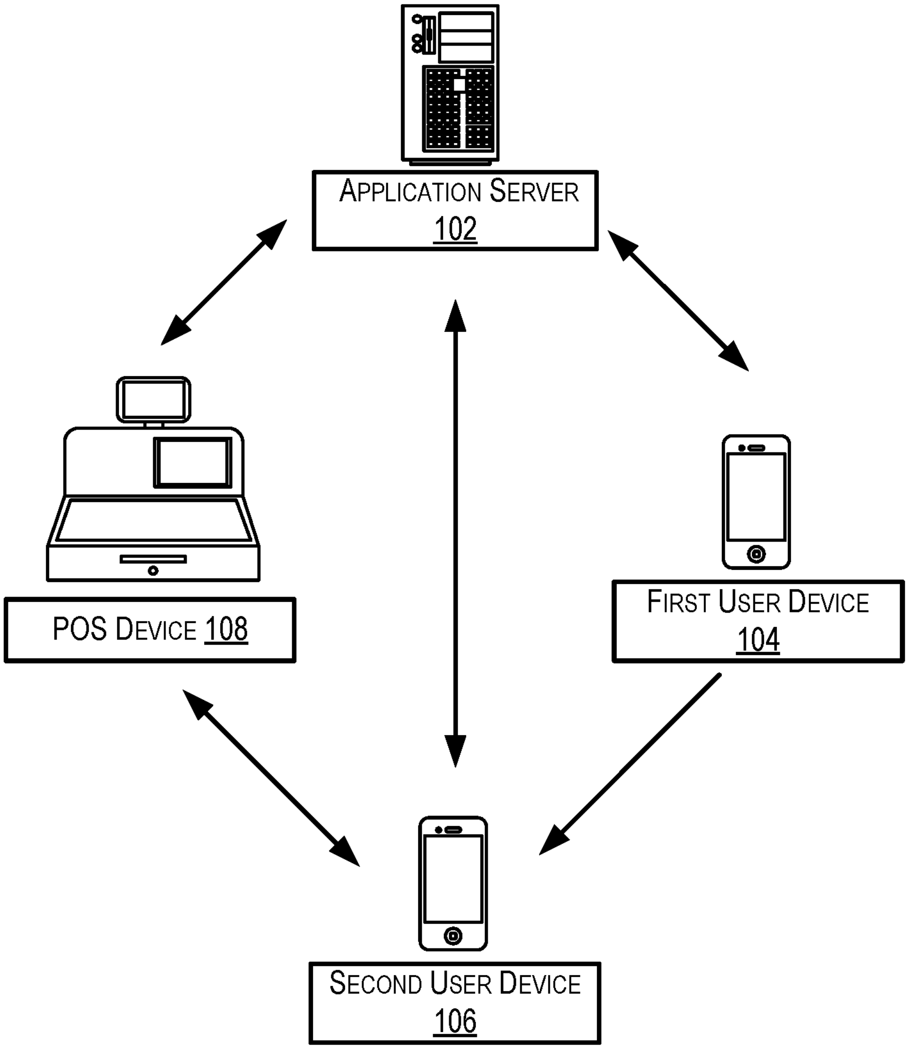
FIG. 1 illustrates an example of a system architecture in which a second user device is enabled for a secure transaction based on restrictions defined via a first user device in accordance with at least some embodiments.

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Embodiments of the present disclosure are directed to, among other things, a secure access to an online service based on a token exchange. In an example, a set of servers execute a program code to provide the online service to user devices. The online service can be available to a first user account managed by the set of servers. Upon a login to the first user account via a first user device, the first user device can present a user interface controlled by the online service. User input can be received via the user interface to define a set of restrictions about using a functionality of the online service via a second user device unassociated with the first user account. For example, no login to the first user account via the second device may be needed to access the functionality, subject to the set of restrictions. The set of servers can store restriction data that represents the set of restrictions, generate and send a secure credential to the first user device, and associate the secure credential with the restriction data. Upon receiving, from the second user device, and verifying the secure credential, the set of servers can determine that the second user device is authorized to access the functionality. In response, the set of servers can generate and send a token to the second user device and associate the token with the restriction data. In certain example, the functionality enables interactions of the second user device with a third device on behalf of the first user account. In such an example, the set of servers can receive, from the third device, request data indicating the token and certain characteristics of the interaction. Based on the token, the set of servers can determine the restriction data and can compare the restrictions with the characteristics of the interaction. A positive comparison (e.g., the characteristics satisfy the restrictions), the set of servers can send response data indicating that the interaction is valid or authorized. A negative comparison (e.g., the characteristics violate the restrictions), the set of servers can send response data indicating that the interaction is invalid or unauthorized.

To illustrate, consider the following example. The functionality enables conducting a transaction via the second user device by using a payment method of the first user account. While being located remotely from a brick and mortar store, the first user device can execute an application that presents a first graphical user interface (GUI) and that can be used to login to the online service using a username and password of the first user account. User input can be received via the first GUI and can indicate a maximum transaction value, an expiration date for using the payment method, and user information (such as a phone number, username, etc.) associated with the second user device. Next, the set of servers generates and associates a first personal identification number (PIN) with restriction data indicating the maximum transaction value and the expiration date. As further described herein below, the PIN could also be manually entered by the first user. The first PIN is sent to the first user device, whereby this first PIN can be presented at the first GUI. Based on the user information, the set of servers also sends notification data to the second user device (e.g., via a text message or an application notification). The notification data is associated with the restriction data (e.g., linked thereto) and informs a user about the usability of the first account for a transaction. Upon receiving a request from the second user device to use the first account (e.g., upon a selection of the link) for a transaction purchase to be conducted while the second device is at the brick and mortar store, the set of servers instructs the second device to present a second GUI that requests a PIN entry. Next, the set of servers receives, from the second user device, and compares a second PIN to the first PIN. Upon a PIN match, the server generates a quick response (QR) code (e.g., an example of a token), associates this QR code with the restriction data, and sends this QR code to the second device. Upon a scan of the QR code by a point of sale (POS) device located at the brick and mortar store (which may be an example of the third device), the set of servers receive request data from the POS device. This request data can include QR code data and transaction data. Based on the QR code data, the set of servers determines the maximum transaction value and the expiration data. Based on the transaction data, the set of servers determines an actual value and actual date of the transaction. Assuming that the actual value is smaller than the maximum transaction value and that the transaction is occurring prior to the expiration data, the set of servers determines a positive response, triggers a payment process by which the transaction is recorded against the first user account and the transaction value is charged to the payment method, and sends response data to the POS device indicating that completion of the transaction.

Techniques described herein provide several technical benefits. For example, access to a functionality of an online service by a device unassociated with a user account can be made secure. Different means are used for securing this access. The means not only include a user authentication (e.g., via a login), but also a security credential and restriction data that are associated with each other. Further, the means include a token associated with the restriction data and obfuscating information of the user account. Further, secure interactions between the device and another device (e.g., the third device in the above paragraphs) can also be managed by means of the restriction data and the token, such that only validated or authorized can proceed.

In the interest of clarity of explanation, various embodiments of the present disclosure are described herein below in connection with a transaction that relies, at least in part, on a payment method. However, the embodiments of the present disclosure are not limited as such and can apply to any type of transactions. For example, a user account can be associated with equipment. A functionality of an online service can include facilitating the rental of equipment. In this case, a set of restrictions can be defined to set parameters for equipment rentals. A security credential can be used to trigger the generation of a token usable to rent and obtain the equipment (e.g., upon presentation to a device where the equipment is stored). In yet another example, a user account can be associated with a secure location (e.g., accessible to users having user accounts with proper credentials). Here, a functionality of an online service can include facilitating the access to the secure location. In this case, a set of restrictions can be defined to set parameters this access. A security credential can be used to trigger the generation of a token usable for presentation to an access device at the secure location.

In addition, various embodiments of the present disclosure are described herein below in connection with a GUI. However, the embodiments of the present disclosure are not limited as such and can apply to any type of user interfaces. For example, a voice user interface (VUI) can be used to receive speech input of a user, where this speed input can be processed using natural language processing techniques to generate input data. This input data would be processed in a similar manner as the processing of input data received via a GUI.

FIG. 1 illustrates an example of a system architecture in which a second user device 106 is enabled for a secure transaction based on restrictions defined via a first user device 104 in accordance with at least some embodiments. As illustrated, the system architecture may include at least the first user device 104, the second user device 106, a POS device 108, and an application server 102 that may be communicatively coupled via one or more data networks.

The first device 104 may execute an application associated with the application server 102. The application may present a first GUI controlled in part by the application server 102. The first GUI may be configured to receive user inputs. In some embodiments, a set of user inputs can be received at the first GUI such that a user may login to a first user account via the application. The user account can be stored and managed by the application server 102 or some other server communicatively coupled with the application server 102. The user account can include information about, for example, a payment method (e.g., a credit card, a mobile payment service such as a mobile application wallet, etc.).

In some embodiments, a set of user inputs can be received via the first GUI, where the user inputs indicate a set of restrictions (e.g., user information, a maximum transaction value, an expiration date, a maximum number of transactions that can be conducted using a payment method, a payment method to use for a transaction method if many payment methods are available, an allowed location for a transaction, an allowed time of day for the transaction, an allowed set of items or types of items that can be obtained, etc.). The first device may send the user input to the application server 102 that then generates and stores restriction data that represents the set of restrictions in association with the first user account (e.g., the restriction data can be stored as part of the information of the first user account). This enables the set of restrictions to be applied to the use of payment method(s) that may also be associated with the user account.

In some embodiments, user input via the first GUI can define the set of restrictions and/or user information to which the set of restrictions applies. For example, the user input may define both the set of restrictions and the user information (second username, phone number, email address, etc.). Alternatively, after entry of the set of restrictions at the first user device 104, the application server 102 may generate and send an invitation to the first user device 104, where this invitation may indicate the set of user restrictions and request the user information.

In some embodiments, a first security credential (e.g., PIN, password, biometric security, information hashes, a secret known to the application server 102 and signed with a public key of the application server 102, etc.) may be generated and associated with allowing the use of the payment method subject to the set of restrictions and user information. The security credential may be generated by the application server 102 and transmitted to the first user device 104. Depending on the type of the security credential, the first device can present the first security credential at the first GUI (e.g., in the case of a PIN) and/or can send the security credential to the second user device 106 (e.g., upon proximity of the two devices, whereby the security credential can be transmitted using wireless and/or optical technologies). Additionally, and/or alternatively, the security credential may be generated by the first user device 104 and sent to the application server 102. Additionally, and/or alternatively, the security credential may be generated by the application server 102 and sent to the second user device 106. Additionally, and/or alternatively, the security credential may be generated by the application server 102, whereby a portion thereof is sent to the first user device 104 and a remaining portion thereof is sent to the second user device 106. In this example, the application server 102 may enable the use of the payment method when both portions are received from the second user device 106, when each portion is received from each respective device, or when both portions are received from the first user device 104 and from the second user device 106. In some embodiments, the first security credential (e.g., in the case of a PIN) may be communicated to a specific user by any means of transmissions, such as a phone call, email, SMS message, word of mouth, etc.

In some embodiments, based on the user information, the application server 102 determines the second user device 106. This second user device 106 can, but need not, be executing another instance of the application. If so, a second user can, but need not, be logged in to a second user account via the application. The application server 102 sends notification data to the second user device 106, where this notification data represents an invitation to use the first user account for a set of transactions. The notification data can be presented via the instance of the application (if executing) or via another application (e.g., via a text messaging application). For example, if a first user, via the first GUI, inputs user information indicating details, such as a second user's phone number, then a resulting invitation may be transmitted to the second user device 106 associated with the second user's phone number. The invitation may be transmitted to the second user device 106 using various means of communication such as via email, SMS messaging, push notification etc. In some embodiments, the invitation may present a clickable link to the user at the second user device 106. Upon selection of the clickable link, a second GUI on the second user device 106 may be presented (e.g., via the instance of the application if executing or via a web browser application).

In some embodiments, the invitation transmitted to the second user device 106 may request at least a second security credential. Depending on the type of the security credential, this request can be presented via the second GUI (e.g., in the case of the PIN). Alternatively, the second user device 106 can send the second security credential without user input indicating this second credential via the second GUI (e.g., in the case of a hash or a signed secret). Upon receiving the second security credential, the application server 102 determines whether a match between the first security credential and the second security credential exists.

In some embodiments, if the security credentials do not match, a visual cue may be presented via the second GUI to indicate the mismatch. If it is determined that the first and second security credentials do match, the application server 102 generates a token (e.g., a barcode, a QR code, a code to be transmitted via a wireless protocol, such as near field communication (NFC) tag, an optical protocol, or a magnetic protocol, etc.). For example, a user at a second user device 106 may input a PIN via a second GUI and, if it is determined that the PIN is a correct match, a QR code, may be generated and presented at the second GUI on the second user device 106. In some embodiments, the token may be generated by the application server 102 and transmitted to the second user device 106 directly. Alternatively, the token may be generated by the application server 102 and transmitted to the first user device 104 that can then send it to the second user device 106 (e.g., upon user request to do so via the first GUI). Alternatively, the application server 102 can generate the token, send a notification to the first user device 104 requesting a confirmation that the token is to be sent to the second user device 106, receive a confirmation from the first user device 104 to do so, and send the token to the second user device 106.

In an example, the token includes token information that can be transmitted to, received by, or read by a third device (e.g., the POS device 108). The token information can indicate a network address (e.g., a uniform resource locator (URL)) of a network storage storing the restriction data. Alternatively, the token itself can encode the restriction data and the user account data. Further, the token information can obfuscate the payment method to use (e.g., by representing this payment method with a unique code or encrypting data of the payment method), where the obfuscation data can be included in the token information or stored in the same or a different network address indicated by the token information. Further, the token information can indicate user account data about the user account (e.g., information that identifies the first user account and/or indicates various properties of the user account such as a membership status, a user status (e.g., a veteran), etc.). Here also, the user account data can be included in the token information or stored in the same or a different network address indicated by the token information. If data is encoded in the token and if the token is presentable via the second GUI, the encoding may render the data not user readable, while being machine readable (e.g., where this data is encoded in a barcode or a QR code as a set of patterns).

Once the token is available to the second GUI, a user may be enabled to use the second user device 106 to complete a set of transactions by interacting with a set of a POS devices 108. The token on the second GUI may be used to communicate token information to a POS device 108. For instance, information may be transmitted to the POS device 108 from the second user device 106 by bringing the second user device 106 with the token in the vicinity of the POS device 108. In some embodiments, the token information may be communicated to the POS device 108 via an optical input device capable of obtaining graphical input, such as a camera device, a barcode reader, a QR code reader, such that the token can be scanned, and token information can be transmitted to the POS device 108. Additionally, and/or alternatively, the token information may be transmitted using other appropriate means of communication, such as using radio frequency (RF) transceivers configured to send and receive communications using NFC, or other RF or wireless communication protocols such as Bluetooth, Bluetooth low-energy (BLE), a wireless local area network (e.g., WiFi), iBeacon, etc. or other communication means, such as optical or magnetic transceivers.

In some embodiments, the POS device 108 sends the token information along with transaction information to the application server 102. The transaction information can indicate transaction properties of the transaction, such as an actual transaction value, a transaction date, a transaction time, a transaction location, item(s) to which the transaction applies, item type(s) to which the transaction applies, etc. Upon receipt of the token information, the application server 102 determines and compares the set of restrictions with the transaction information to determine if the transaction satisfies the set of restrictions (e.g., the actual transaction is smaller than the maximum transaction value, the transaction date is prior to the expiration date, the transaction time is within an allowed time of day, the transaction location is at an allowed location, the item(s) is(are) allowed item(s), the item type(s) is(are) allowed item type(s), etc. If the comparison indicates that the set of restrictions is satisfied, the application server 102 triggers completion of the transaction by using the first user account. The POS device 108 indicates the completion. If the comparison indicates that the set of restrictions is violated, the application server 102 sends response data to the POS device 108 indicating that the token is unusable.

Figure 2:
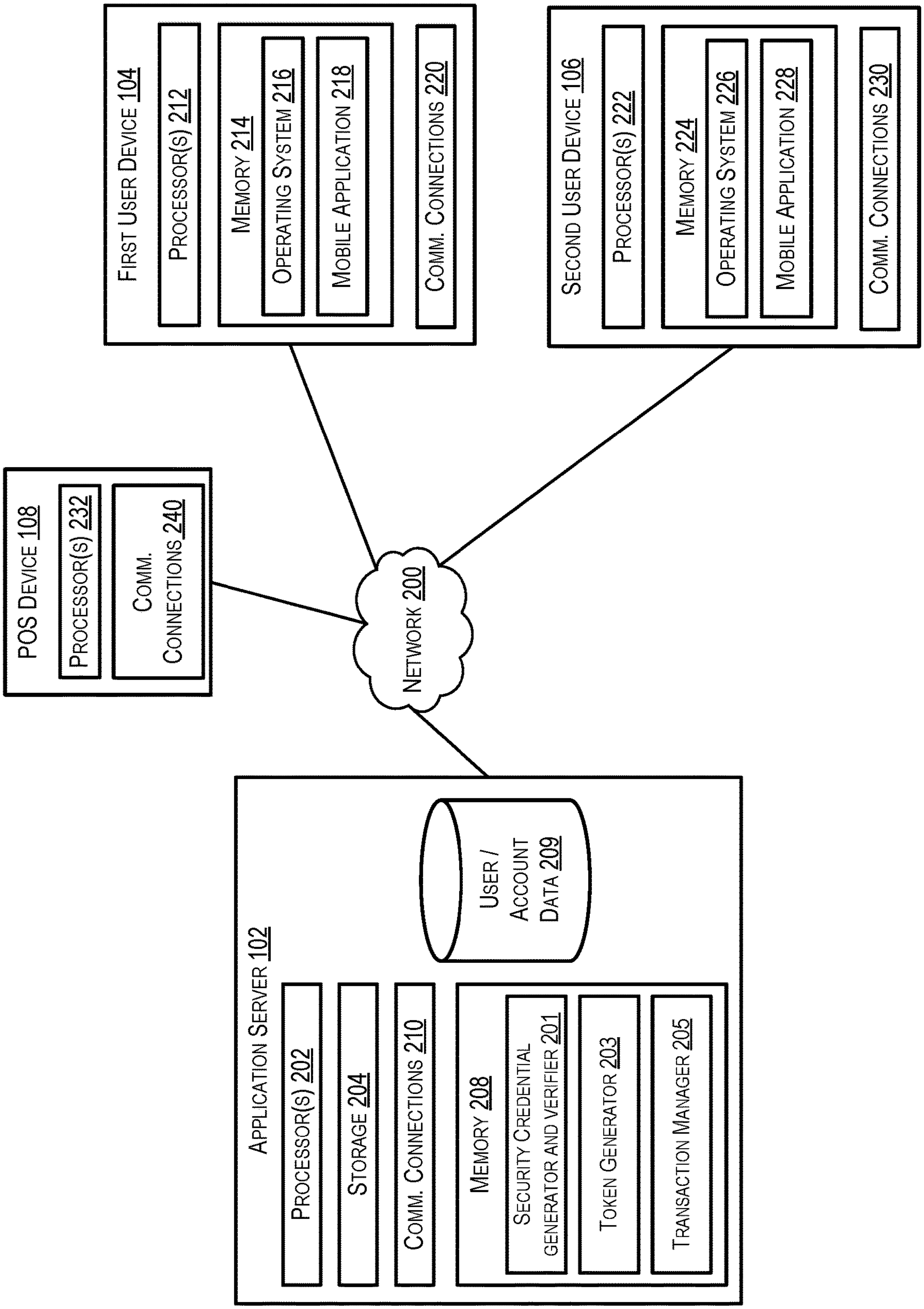
FIG. 2 illustrates an example of a system architecture configured to perform the functionality described in accordance with at least some embodiments.

FIG. 2 illustrates an example of a system architecture configured to perform the functionality described in accordance with at least some embodiments. As illustrated in FIG. 2, an exemplary architecture may include a first user device 104, a second user device 106, a POS device 108, and an application server 102 as described with respect to FIG. 1 above. One or more of these components may communicate either directly or over a network 200.

The application server 102 may be any type of a system configured to perform at least a portion of the functionality described herein. In some embodiments, the application server 102 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative example, the application server 102 may include at least one memory 208 and one or more processing unites (or processor(s) 202). The processor(s) 202 may be implemented as appropriate in hardware. Computer-executable instruction may be used by the processor(s) 202 and may include computer-executable, or machine executable instructions written in any suitable programming language to perform the various functions described. The application server 102 may also include additional storage 204.

The memory 208 may store program instructions that are loadable and executable on the processor(s) 202, as well as data generated during the execution of these programs. Depending on the configuration and type of application server 102, the memory 208 may be volatile (such as random-access memory (RAM)) and/or non-volatile (such as read-only memory (ROM), flash memory, etc.). The application server 102 may also include additional the storage 204, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 208 may include multiple different types of memory, such as static random-access memory (SRAM), dynamic random-access memory (DRAM) or ROM.

The application server 102 may also include an operating system and one or more application programs or services for implementing the features disclosed herein included at least a module for generating and verifying security credentials associated with user payment methods. In some embodiments, a security credential generator and verifier 201 may be used to provide one or more levels of security when enabling a user device to complete. As described herein above, different types of security credentials are possible. Regardless of the type, a security credential can be expirable (e.g., can expire after a time interval elapses, thereby rendering the security credential unusable). The length of the time interval can be predefined or can be set based on a user setting associated with a user account for which the security credential is generated. The features disclosed herein further include at least a module for generating tokens and associating the tokens with restrictions and user accounts. For example, upon verification of a security credential generated for a user account, a token generator 203 can generate and associate a token with a set of restrictions defined for the user accounts. The features disclosed herein also include at least a module for managing transactions to facilitate the completion of transactions, and for or storing and accessing user account data 209. Based on the user account data 209, the transaction manager 205 can provide information related to users and user accounts (e.g., membership status data, user demographic data as well as user devices, payment methods, etc.) and can enable the association of at least user payment methods, user information, and sets of restrictions to user accounts. In some embodiments, at least the user account data 209 and restriction data may be stored in a datastore.

The memory and the additional storage, both removable and non-removable are examples of computer-readable storage media. For example, computer-readable storage media may include volatile, or non-volatile, removable or non-removable media implemented in any method or technology for storage of information such as computer-readable instructions, data structures, program modules or other data. As used herein, modules may refer to programming modules executed by computing systems (e.g., processor(s)) that are installed on and/or executed from the application server 102. The application server 102 may also contain communications connection(s) 210 that allow the application server 102 to communicate with a stored datastore, another computing device or server 102, user devices, user terminals, and/or other components of the described system. The application server 102 may also include input/output (I/O) device(s) and/or ports, such as for enabling connection with a keyboard, a mouse, a pen, a voice input device, a touch input device, a display, speakers, a printer, etc.

In some embodiments, the transaction manager 205, the token generator 203, and the security credential generator and verifier 201 may be configured to, in conjunction with the processor(s), enable the completion of payment transactions by a second user device 106 at a POS device 108 on behalf of a first user account without disclosing payment details to unauthorized parties. In some embodiments, the application server 102 may receive data indicating that a particular set of restrictions (e.g., user information, transaction value, expiration date, etc.) is associated with the first user account. Upon receipt of this indication, transaction manager 205 may be used to associate the first user account with the set of restrictions. The security credential generator and verifier 201 may be used to generate a first security credential which may be associated with using a payment method further associated with the first user account. Based at least in part on the user information associated with the first user account, an invitation may be generated and sent to a second user device 106, where the invitation requests security credential to use the first user account for a set of transaction. Upon receipt, at the application server 102, of a second security credential from the second user device 106, the security credential generator and verifier 201 may be used to determine a match between the first security credential and the second security credential. If a match is determined, the token generator 203 can generate a token for the set of transactions, can associate the set of restrictions with the token, and can send the token to the second user device 106. When the token on the second user device 106 is used in conjunction with a POS device 108 and based on the applicability of the set or restrictions, the transaction manager 205 may transmit data to a POS device 108 to facilitate the use of a payment method for a transaction.

In some embodiments, a user device (e.g., the first user device 104 or the second user device 106) may comprise any portable electronic device capable of performing the functions disclosed herein as being attributed to the user device. The user device may include a memory (214/224, such as a computer-readable storage medium) storing instructions that, when executed by a processor(s) 212/222 of the user device, enable the user device to perform its intended functions. The memory may include an operating system 216/226 that provides executable program instructions for the general administration and operation of the user device, and at least a mobile application 218/228 configured to cause the user device to communicate with the application server 102 in order to facilitate a transaction. Furthermore, the user device may include a number of communication connections 220/230 which enable the user device to communicate with other electronic devices. The communication connections 220/230 may include wireless or direct physical connections. Additionally, wireless connections may include any combination of short-range or long-range wireless protocols.

In some embodiments, the mobile application 218 may present a first GUI which enables a user to interact with the mobile application 218. The mobile application 218 may present, via the GUI, at least one or more of a field for inputting or selecting user information (e.g., which may include selecting a payment method), fields to setting restrictions (e.g., a field for inputting the transaction value, a field for inputting an expiration date), and fields for inputting user information (e.g., a user name, phone number, email address, or other type of contact information to identify a second user account and/or a second user device 106). The mobile application 218 may be configured to receive user input via the first GUI and to transmit the relevant data to the application server 102, the second user device 106, and/or the POS device 108. For example, a user at the first user device 108 may input a set of restrictions via the first GUI, which may be transmitted to the application server 102 and associated with a first user account. The first GUI may further include further restrictions indicating whether a transaction value is usable for multiple transactions or not. For example, the first GUI may present an option which enables the transaction value to be applied to more than one transaction at a POS device 108.

As described elsewhere, the POS device 108 may be capable of conduction a transaction in relation to a token at a second user device 106. The POS device 108 may include a processor(s) 232 for executing program code stored by the POS device 108. The POS device also includes a number of communication connections 240 which enable the POS device 108 to communicate with other devices. The communication connections 240 may include wireless communications, optical connections, magnetic connections, or other types of communications. Additionally, a wireless connection may include any combination of short-range or long-range wireless protocols. Rather than communication with a device, the POS device 108 can read data presented at a GUI of the device by including a camera device, a barcode reader, a QR code reader, etc. Furthermore, the POS device 108 may include a display device. For example, if, based on token information, user account data associated with a first user account is determined, then the display device present the user account data.

In some embodiments, the application server 102 may be configured to provide payment details to a POS device 108 for the purpose of completing a transaction. To do this, the second user device 106 may provide a token associated with a first user account. The user account may further include associations with one or more payment methods and a set of restrictions (e.g., user information, transaction value, expiration date, etc.). For example, a token received by the second user device 106 from the application server 102 can be communicated to the POS device 108 (e.g., via an optical scan, wireless communications, optical communications, magnetic communications, etc.). Once the POS device 108 has obtained the token information, the POS device 108 may communicate with the application server 102 to transmit, to the POS device 108, a verification that the first user account is usable and, if so, data about such a use (such as payment method details or an obfuscation code of the payment method and/or user account data). In some embodiments, a display associated with the POS device 108 may display at least some of the data received from the application server 102.

In some embodiments, the communication network may include any one or a combination of many different types of networks, such as cable networks, the Internet, wireless networks, cellular networks, and other private and/or public networks. In addition, the communication network may comprise multiple different networks. For example, the user device(s) may utilize a 4G or 5G network to communicate with a wireless router, which may then route the communication over a public network (e.g., the Internet) to the application server 102.

Figure 3:
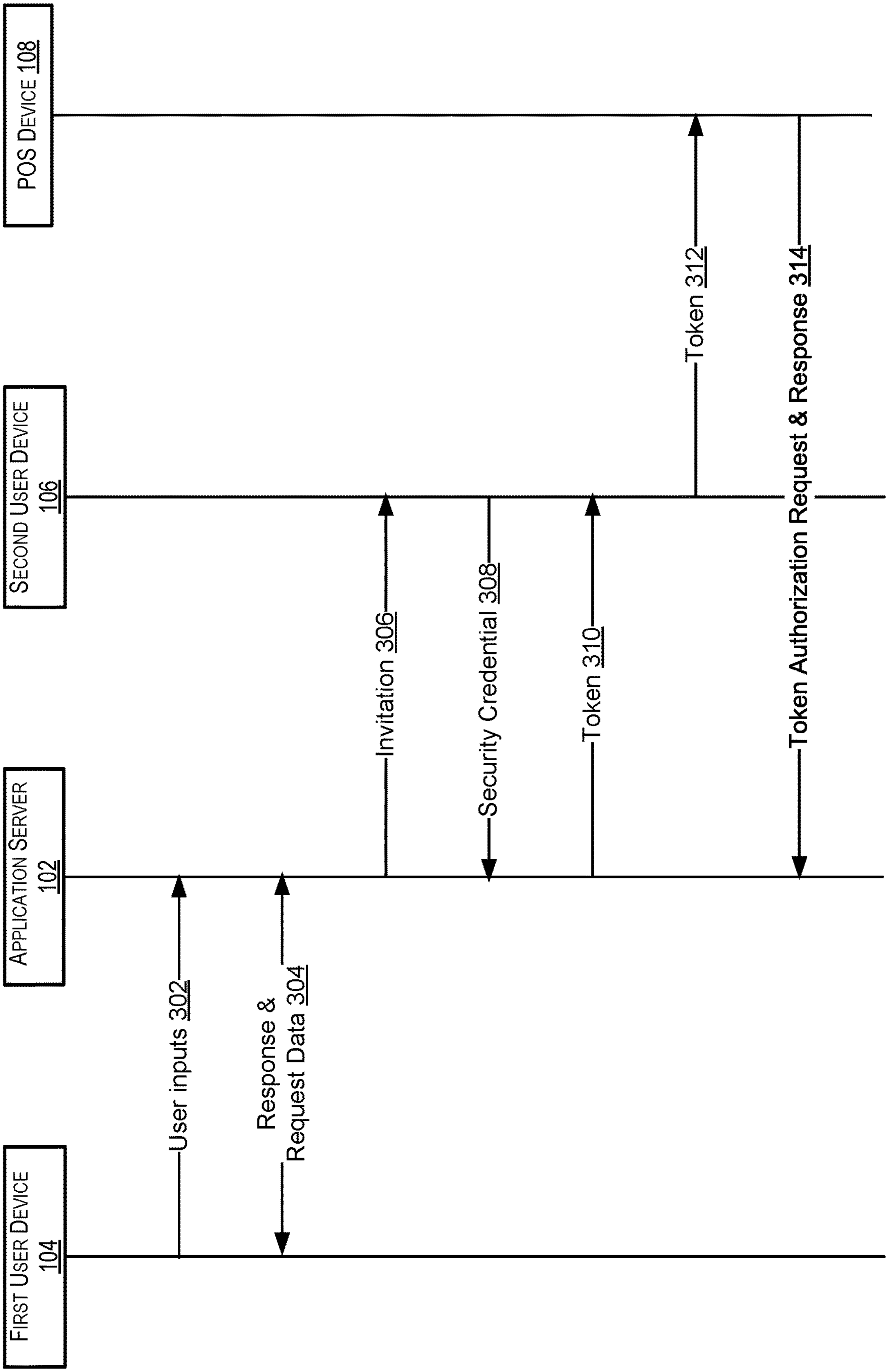
FIG. 3 illustrates an example of a process for transmitting and using a token at a point of sale (POS) device using a first graphical user interface (GUI) at a first device and a second GUI at a second device in accordance with at least some embodiments.

FIG. 3 illustrates an example of a process 300 for transmitting and using a token at a point of sale (POS) device using a first GUI at a first device and a second GUI at a second user device 106 in accordance with at least some embodiments. Some or all of the process 300 (or any other process described herein, or variations and/or combinations thereof) may be performed under the control of one or more computer systems configured with executable instructions and may be implemented as code (e.g., executable instructions, one or more computer programs or one or more applications). In accordance with the embodiments of the disclosure, the process 300 of FIG. 3 may be performed by at least the first user device 104, the application server 102, the second user device 106, and the POS device 108 shown in FIGS. 1-2. The code may be stored on a computer-readable storage medium, for example, in the form of a computer program including a plurality of instructions executable by one or more processors. The computer-readable storage medium may be non-transitory.

Process 300 may begin at 302 where a set of user inputs received via the first GUI on the first device 104 is transmitted to the application server 102. The set of user inputs may indicate a set of restrictions (e.g., user information, a transaction value, an expiration date, etc.) for using a payment method associated with a user account. Once entered via the first GUI, the set of restrictions may be communicated to the application server 102 that then associates this set with the user account. In some embodiments, the first device 104 may also be associated with the user account. For example, using the first GUI at the first device 104, a user may login to their user account.

In some embodiments, the first user device 104 may receive request data from the application server 102 and send respond data to the application server 102 at 304. The request data may request user information with which the set of restrictions is to be associated. The response data may include the user information, such as a username, user phone number, user email address, user account identifier, or some other user contact information. The application server 102 determines that the second user device 106 is associated with the user information (e.g., based on a look up of a database associating user information with device identifiers and/or a look up of a first database associating user information with account information and a same or another look up of the first database or a second database associating the account information with device identifiers). The application server 102 optionally associates the set of restrictions with the second user device 106 or a second user account accessible via the second user device 106.

In some embodiments, the application server 102 may transmit an invitation to a second user device at 306 to use the first user account (or a payment method thereof) when it is desired to do so in association with a transaction. The invitation can be sent as notification data that the second user device 106 can present.

In some embodiments, the second user device 106 may transmit a second security credential and request a token from the application server 102 at 308. The second GUI on the second user device 106 may display the invitation requesting a second security credential to enable the second user device 106 to use a particular payment method. The second security credential may be conveyed to a user of the second user device 106 or the second user device 106 itself using various communication means as described herein above. Upon receiving the second security credential, the application server 102 determines whether the second security credential matches the first security credential. Different techniques are available to determine the first security credential for the purpose of comparison. In one example, the second security credential is compared to all existing an unexpired security credentials. In this example, a match to the first security credential is determined. Based on this match, the application server 102 determines the first user account for which the security credential was generated. In another example, the invitation sent to the second user device 106 includes an identifier of the first user account. The request for the token received from the second user device 106 can include this identifier. Accordingly, the application server 102 can determine the first user account and the associated first user credential that is then compared with the second security credential. In yet another example, the invitation need not include the identifier of the first user account. Instead, the request for the token can identify the second user device 106 (or the second user account). Here, the application server 102 uses the identifier to determine the first user account that indicated this identifier as part of the user information received to define the set of restrictions, to then determine the first security credential to be compared with the second security credential. If a match is determined, the process 300 continues. Otherwise, a visual cue may be generated to indicate the mismatch. For example, a message stating that the input second security credential is not a match for the first security credential. In this case, multiple attempts to provide the correct security credential may be repeated via the second user device 106, until a maximum number of attempts is reached. At such point, the process 300 can be terminated.

In some embodiments, assuming a security credential match is determined, the second user device 106 may receive a generated token at 310. The token may be used to complete a transaction at the POS device 108 and may be associated with the set of restrictions in connection with the user account.

In some embodiments, the second user device 106 may communicate the token to the POS device 302 at 312. Token information may be read via an optical scan and/or transmitted optically, wirelessly, or magnetically (e.g, based on proximity of the second suer device 106 to the POS device 108).

In some embodiments, the application server may receive a request for authorizing the use of the token from the POS device 108 at 314. The POS device 108 may send token information and transaction information to the application server 102. In turn, the application server 102 determines and compares the applicable set of restrictions with the transaction information to generate a positive or negative response. The response (positive or negative) can be sent to the POS device 108. In the case of a positive response, the application server 102 can trigger the completion of the transaction. Alternatively, the POS device 108 can trigger this completion. In the case of the negative response, the use of the first user account to complete the transaction is denied. Alternatively, rather than the application server 102 comparing the restrictions with the transaction information, this comparison can be local to the POS device 108. For example, the POS device 108 can send some or all of the transaction information to the application server 102 that then returns the applicable set of restrictions. Thereafter, the POS device 108 compares the set of restrictions with the transaction information to generate a positive or negative response and trigger the next steps in completing or denying the transaction.

In some embodiments, the application server 102 may be update the first user account based on the positive or negative response. In the case of a positive response (determined locally by the application server 102 or received from the POS device), the application server 102 updates the user account to indicate that the payment method was used and related transaction information (e.g., date, time, location, transaction value, etc.). The set of restrictions can also be updated if the payment method is set up for use for multiple transactions. In particular, the maximum transaction value can be reduced by the transaction value. In the case of a negative response (determined locally by the application server 102 or received from the POS device), the application server 102 updates the user account to indicate the denial and related transaction information (e.g., date, time, location, transaction value, etc.).

Referring back to FIGS. 1-3, various embodiments are described in connection with sending an invitation to a second user device 106. In such embodiments, the invitation can inform a second user of the second user device 106 that an authorization for a set of transactions subject to restrictions has been created by a first user. The invitation is also usable to trigger the process of using the authorization (e.g., based on a selectable link included in the invitation). However, the embodiments of the present disclosure are not limited as such. For example, an application server 102 can send the invitation to a first user device 104 of the first user, where the first user can operate the first user device 104 to provide (e.g., send or forward) this invitation to the second user device 104. In this case, when the first user defines the authorization and the related restrictions via a first GUI, no user input may be needed (although it is possible) to define the relevant user information (e.g., the information about the second user who is the recipient of the authorization and/or their second user device 106). When the invitation is provided from the first user device 104 to the second user device 106, the first user device 104 may also automatically send data to the application server 102 indicating that the invitation has been provided. In this case, if not already done as part of the initial creation of the authorization, this data can also possibly identify the second user and/or the second user device 106.

In a further embodiment, when the first user device 104 indicates, to the application server 102, that an invitation has been provided to the second user device 106 and the related user information, the application server 102 can use the user information, in addition to using a security credential, to validate the subsequent use of a payment method or a first user account of the first user for a transaction conducted at least in part by using the second user device 106. In particular, the application server 102 can store and associate the received user information with the authorization, where this user information can identify an authorized user and/or an authorized user device. As such, when a request for a token is received from the second user device 106, this request can also identify the second user and/or the second user device 106. The identified second user and/or second user device 106 can be compared to the user information to determine a match. This user information match can be used in conjunction with the security credential match to return the token. For example, the application server 102 returns the token only if the user information match and the security credential match exist. Otherwise, the token is not returned.

In an additional or alternative embodiment, and regardless of whether an invitation is sent to a first user device 104 and/or a second user device 106, a token related to this invitation can be sent to the first user device 104 (in addition or alternative to being sent to the second user device 106). In the case of an application server 102 sending the token to only the first user device 106, the first user device 106 can provide the token to the second user device 106. Here also, the first user may not need (but doing so is possible) input the user information about the second user and/or the second user device 106 via the first GUI as part of defining the authorization. When the token is provided from the first user device 104 to the second user device 106, the first user device 104 may also automatically send data to the application server 102 indicating that the token has been provided and, possibly, identifying the second user and/or the second user device 106.

In a further embodiment, when the first user device 104 indicates, to the application server 102, that a token has been provided to the second user device 106 and the related user information, the application server 102 can use the user information, in addition to using a security credential, to validate the use of the token. In particular, the application server 102 can store and associate the received user information with the token, where this user information can identify an authorized user and/or an authorized user device. As such, when token information is received from a POS device 108, the POS device 108 also sends user information that identifies the second user and/or the second user device 106. This sent user information can be entered manually at an input device of the POS device 108 or could be generated automatically by the POS device 108 (upon a scan of a membership card of the second user, upon a scan of the token where the token itself encodes or includes a link to the user information). As such, the application server 102 has access to stored user information and to sent user information. The two sets of information can be compared to determine a match. This user information match can be used to validate that the token is usable for the transaction. For example, the application server 102 determines that the token is usable only if the user information match exists. Otherwise, the token is unusable.

In a further embodiment, upon an application server 102 receiving token information from a POS device 108, a notification can be sent to a first user device 104 to confirm that the token is usable for a transaction. Likewise or alternatively, upon an application server 102 receiving a request to obtain (e.g., download) a token from a second user device 106, a notification can be sent to a first user device 104 to confirm that the token can be provided to the second user device 106. In both cases, only a positive confirmation results in the application server 102 determining that the token is usable or downloadable (as applicable). In both cases also, the application server 102 receives a request (e.g., from the POS device 108 or from the second user device 106) to then determine that the token is associated with an authorization and that the authorization is associated with a first user account. Accordingly, the application server 102 determines the first user device 106 and sends the notification thereto. A first GUI can then present an option to accept or reject the use or download of the token. A selection of the accept option results in the positive confirmation. Otherwise, the result is a negative confirmation.

Figure 4:
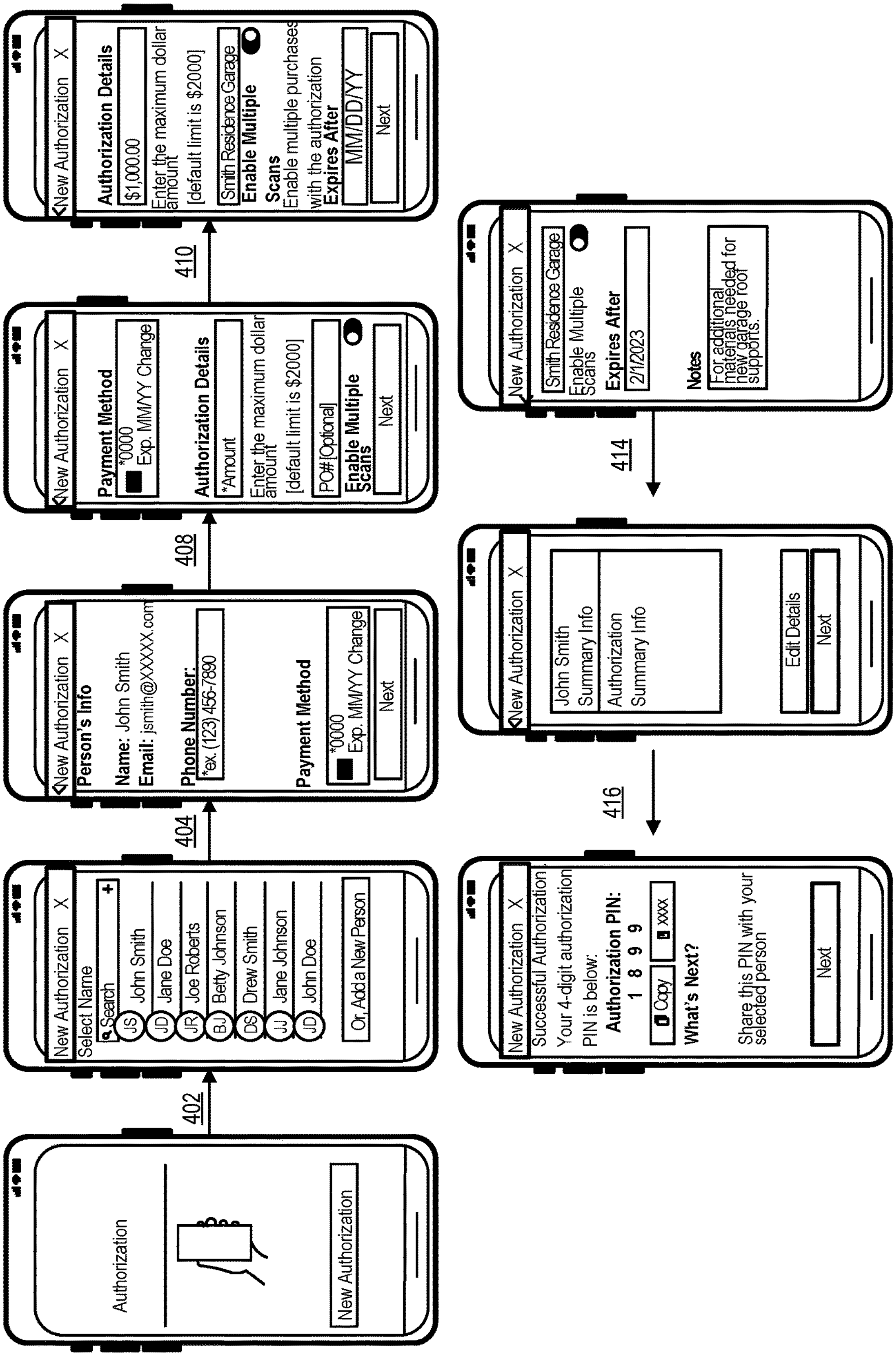
FIG. 4 illustrates an example of user interactions enabled via a first GUI presented on a first user device in accordance with at least some embodiments.

FIG. 4 illustrates an example of user interactions enabled via a first GUI presented on a first user device 104 in accordance with at least some embodiments. A series of interactions, via the first GUI, to cause the generation and transmission of an invitation to a second user device 106 are illustrated and labeled 402, 404, 406, 408, 410, 412, 414, 416 and 418. As illustrated at 402, the first GUI may be used to initiate a new purchase authorization, where the purchase authorization enables a second user to operate the second user device 106 to complete a transaction at a POS device 108 on behalf of the first user of the first device. The first GUI may display a GUI pane with one or more options on the GUI which a user may interact with to initiate the payment authorization. In some embodiments, the GUI is enabled to receive inputs via keyboard, mouse, pen, touchscreen, etc.

Upon initiation of a new purchase authorization, the first GUI may display one or more selectable usernames as illustrated at 404. A selectable username corresponds to a device of which may be authorized to complete transactions on behalf of a first user. For instance, the first GUI may be used to select the username "John Smith" associated with the second user device 106. In some embodiments, the username is associated with user information such as a name, email address, phone number, etc. When a particular username is selected, user information fields on the first GUI are populated with the user information associated with the username as illustrated at 406 when such information is available from a database. In some embodiments, if a particular username is not displayed on the first GUI, the first GUI may be used to input user information into the user information fields manually as illustrated at 408. For example, if the username "Jane Smith" is not included in the list of usernames, the first GUI may be used to enter user information corresponding to this user.

The first GUI may further be configured to receive inputs related to a payment method (e.g., credit card, mobile payment service, etc.). Selectable fields on the first GUI may be used to input or select payment details corresponding to a payment method. For example, the first user of the first device may input their credit card information using one or more fields displayed on the first GUI. In some embodiments, the payment details may be automatically populated in the input fields on the first GUI (when such information is available from a database). For example, if the first user previously input and stored the payment details for a credit card under their first user account, the subsequent display of the payment method fields may auto-populate with the payment details for the credit card.

Inputs corresponding to one or more restrictions and/or notes may be received at the first GUI as illustrated at 412 and 414. In some embodiments, a set of restrictions (e.g., transaction value, expiration date, single versus multiple uses of a token-shown as scans, etc.) may be input using the first GUI. In some embodiments, a user may input a restriction to limit the authorized transaction value. For example, the first GUI may be used to limit the transaction value to $300, thus, if a transaction that exceeds $300 is attempted, the transaction value restriction may prevent the completion of the transaction using the payment method of the first user account. In some embodiments, the one or more restrictions may include an expiration date. inputs received at the first GUI may indicate an expiration date on which the purchase authorization may no longer enable transactions to be completed using the payment method. For example, the first GUI may be used to input an expiration date that is ten days out from the current date, thus, if a purchase is attempted eleven days out from the current date, the expiration date restriction may prevent the complete of the transaction. In some embodiments, a maximum and/or minimum time range may be set for the expiration date restriction to apply, such that a user may be prevented from inputting an expiration date that exceeds the time range limit. For example, a time range of a week may be set, such that if a user attempts to input an expiration date more than a week out, the first GUI will prevent the entry of said input. In some embodiments, the first GUI may further be configured to receive inputs indicating additional information, such as types of items that may be purchased using the purchase authorization, the name of the project associated with the purchase authorization, an allowed location for a purchase, other conditions, etc.

After receipt of one or more inputs indicating the transaction details which may include at least user information, payment details, and/or a set of restrictions, the first GUI may display the transaction details as illustrated at 416. In some embodiments, after review, the transaction details may be revised by using at least one selectable option on the first GUI. Upon selection, the first GUI may return to displaying the one or more fields as illustrated in 406, 410, 412, and/or 414. The first GUI may then enable a user to edit the transaction details via the input fields and proceed to review of the transaction details as illustrated at 416. In some embodiments, after review, the transaction details may be accepted using at least one selectable option on the first GUI.

In some embodiments, the first GUI may be configured to display a security credential (e.g., a pin, a password, etc.) as illustrated at 418. After acceptance of the transaction details, a first security credential may be generated and displayed via the first GUI. In some embodiments, the first security credential may be generated at the first user device 104. Alternatively, and/or additionally, the first security credential may be generated remotely from the first user device 104 (e.g., at the application server 102). In some embodiments, the first security credential may be communicated to a second user device 106 by using a communication method such as SMS message, email, push notification, etc. Alternatively, and/or additionally, the first security credential may be communicated for use at the second user device 106 using methods such as a phone call, face to face interaction, etc. In some embodiments, the first GUI may further include one or more selectable options, which, upon selection, initiate the generation and transmittal of an invitation based on the input user information.

Figure 5:
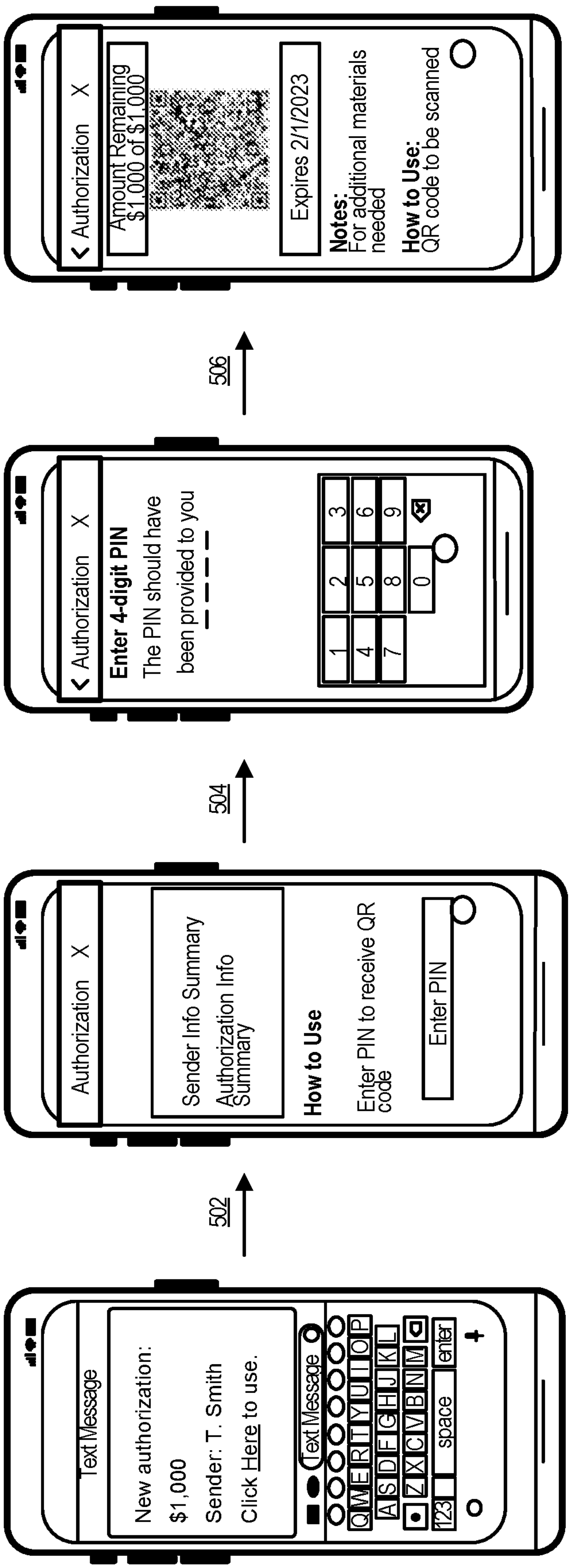
FIG. 5 illustrates an example of user interactions enabled via a second GUI presented on a second user device in accordance with at least some embodiments.

FIG. 5 illustrates an example of user interactions enabled via a second GUI presented on a second user device 106 in accordance with at least some embodiments. An invitation may be transmitted to and displayed on the second user device 106 based on at least user information that may correspond to the second user device 106. For example, the user information may provide the name "John Smith" and John Smith's phone number, thus, an invitation may be sent to John Smith's phone which corresponds to the second user device 106. In some embodiments, the invitation may be received at the second user device 106 using various methods of communication such as SMS messaging, email, push notification etc.

In some embodiments, the invitation may inform the second user about the authorization to use a first user account for a transaction, identify the first user that has requested this authorization, and indicate some or all of the restrictions. The invitation may also include one or more selectable options. When the one or more selectable options are selected, the process to enable the use of the first user account (or more specifically the specified payment method of the first user account subject to the set of restrictions) via the second user device 106 can be triggered as illustrated at 502. As illustrated, a hyperlink in the invitation may be selected, which results in the display of transaction details, such as user information, a transaction value, and expiration date, and the description about using the authorization.

In some embodiments, the invitation may request at least a second security credential (e.g., PIN, password, biometric security, etc.) for using the authorized payment method, as illustrated at 504. Upon entry of the second security credential, a determination may be made as to whether the first and second security credentials match. In some embodiments, if the first and second security credentials do not match, a visual or physical cue (e.g., haptic feedback, message indicating the mismatch, color change, etc.) may be used to indicate the mismatched credentials.

If it is determined that the first and second security credentials do match, a token may be generated and displayed via the second GUI as illustrated at 506. The token displayed via the second GUI may be associated with the authorized payment method subject to the set of restrictions. This token can be scanned by a POS device 108 in association with a transaction.

Referring back to FIGS. 4-5, Depending on user input via the first GUI (as shown in FIG. 4), the token can be used for a single transaction (e.g., a single scan by the POS). After this single use, the token may no longer be presented by the second user device 106 (e.g., by automatically being deleted from memory of the second user device or by being associated with an "unusable" flag or property). Or, if presented, the token may no longer be usable for a next transaction (e.g., the application server 102 can expire the token or store "unusable" flag or property for the token). If usable for multiple transactions, the token can continue to be presented by the second user device 106 until such a use is no longer possible. Different techniques are available to update the multiple uses of the token. In one example, after each use, the application server 102 reduces the maximum transaction value. In this example, once this maximum reaches or drops below a threshold value (e.g., zero), the token can no longer be used. Additionally, or alternatively, the user input via the first GUI can set a maximum number of uses. As such, after each use, the application server 102 decrements this number by one. In this example, once this this number reaches zero, the token can no longer be used. Once it is not longer usable, the token may no longer be presented by the second user device 106 or, if presented, may have an "unusable" flag or property.

Figure 6:
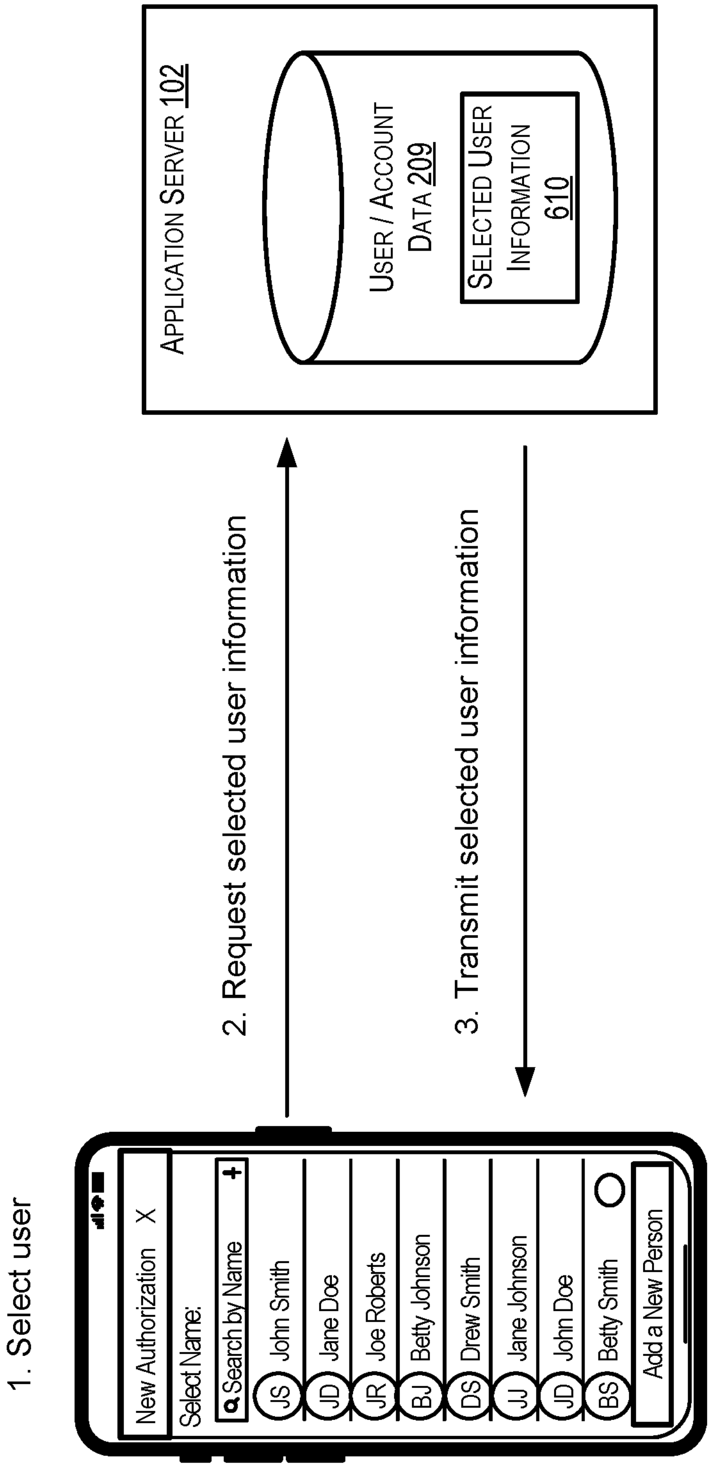
FIG. 6 illustrates an example of a first GUI at a first device enabled to select a user and retrieve selected user information in accordance with at least some embodiments.

FIG. 6 illustrates an example of a first GUI at a first user device 104 enabled to select a user and retrieve selected user information in accordance with at least some embodiments. The first GUI at the first user device 104 may be used to select a user of a second user device 106 to which an invitation can be sent. In some embodiments, the first GUI may display a list of usernames identifying particular users. The one or more usernames may be associated with user information 610, such as user device identifiers and/or user account identifiers, stored at an application server 102. Each username on the first GUI may be selectable. The user information 610 stored at the application server 102 may be requested by selecting a particular username displayed on the first GUI. In response to the request, the selected user information may be transmitted back to the first user device 104. In some embodiments, the selected user information may be cached at the first user device 104, enabling the subsequent retrieval of this information.

Figure 7:
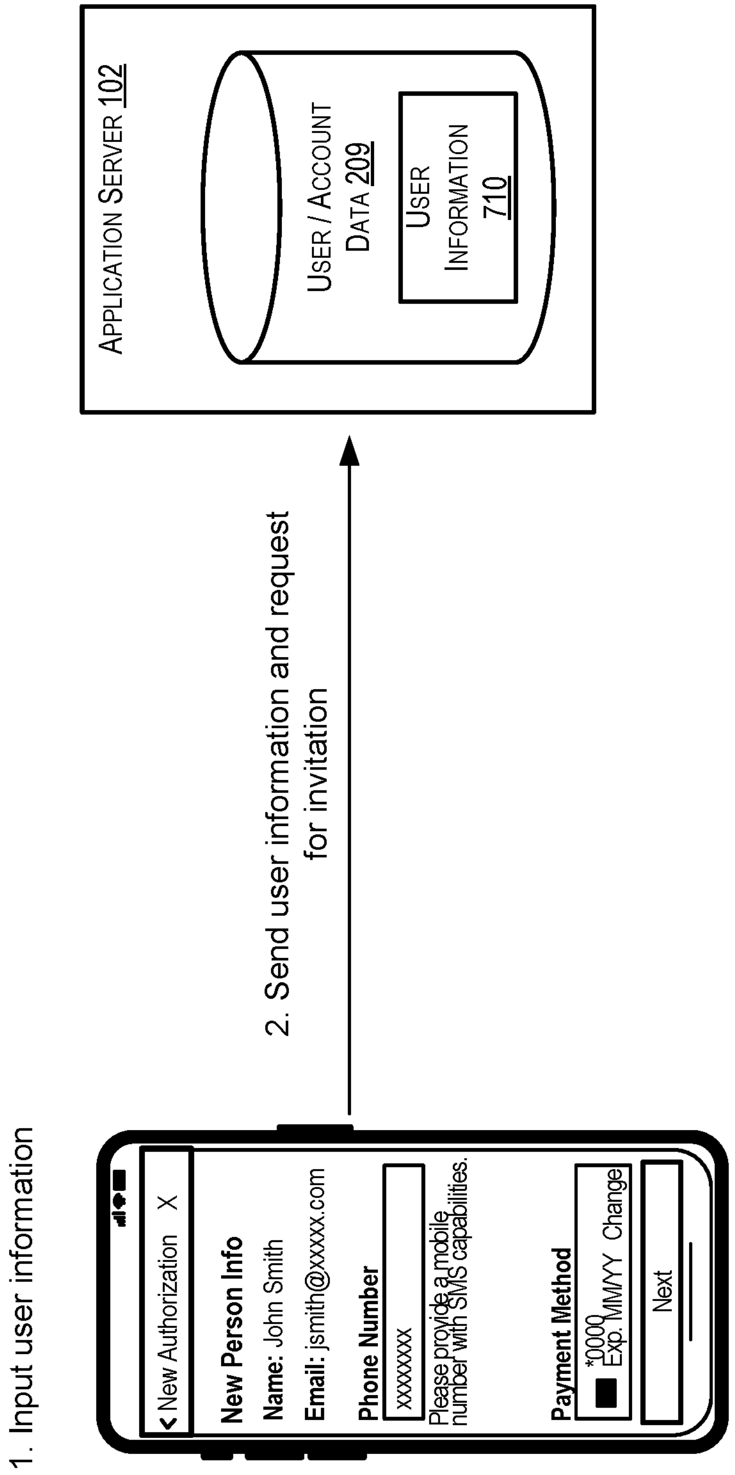
FIG. 7 illustrates an example of a first GUI at a first device enabled to select a user in accordance with at least some embodiments.

FIG. 7 illustrates an example of a first GUI at a first user device 104 enabled to select a user in accordance with at least some embodiments. Unlike FIG. 6, an application server 102 does not store or has access to user information for the user. Instead, the first GUI may be used to input the user information used as part of a request for generating an invitation to be sent to a second user device 106 associated with the user information. In some embodiments, the first GUI may include one or more fields to input user information (e.g., username, phone number, email, etc.). Once the user information is input into the fields displayed on the first GUI, a request to send the invitation may be sent to the application server 102. The request may include the user information, which may be used to generate the invitation. In some embodiments, the user information may be stored at the application server to enable subsequent retrieval (shown as user information 710 stored under the user account data 209). Alternatively, and/or additionally, the input user information may be stored at the first user device 104, such that when the first GUI is used again, the one or more fields may be populated with the stored user information.

Figure 8:
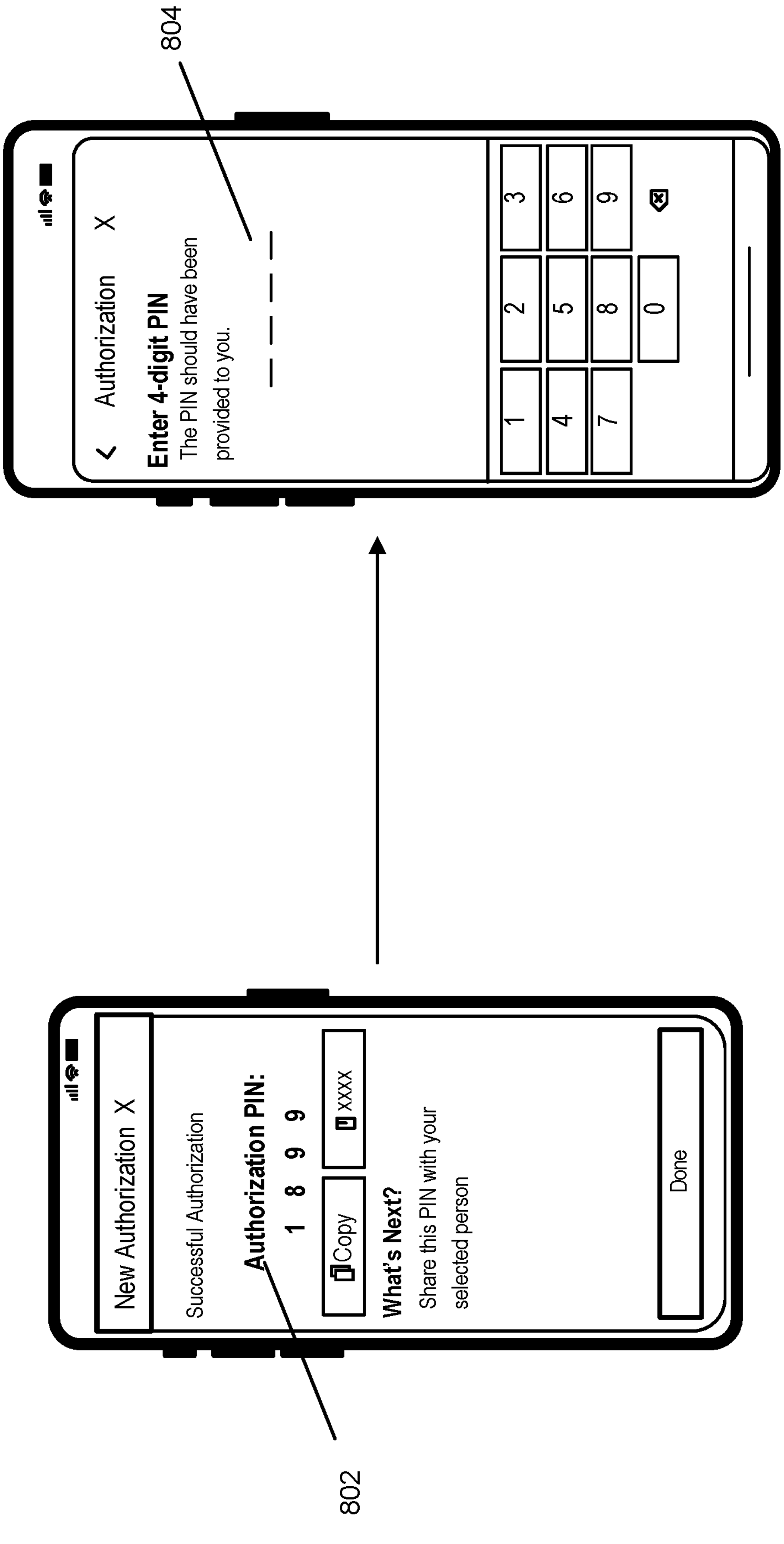
FIG. 8 illustrates an example of implementing security credentials via first and second GUIs in accordance with at least some embodiments.

FIG. 8 illustrates an example of implementing security credentials via first and second GUIs in accordance with at least some embodiments. One or more security credentials may be used to ensure that payment methods associated with a user account are not used by unauthorized individuals.

After an authorization for using a payment method and related restrictions are submitted via the first GUI at a first user device 104, the first GUI may display a first security credential at 802. For example, in the illustration of FIG. 8, a four-digit pin (an example of the first security credential) may be displayed via the first GUI. The first security credential 802 may be shared with a user of the second device via any suitable means of communication, such as a SMS message, a phone call, an email, a face-to-face interaction, etc.

The second GUI at the second user device 106 may be used to input a second security credential. The second GUI may be configured to allow the input of the second security credential as illustrated at 804. For example, the second GUI may display four input fields 804 which may be filled with a four-digit pin using an input device (e.g., a keyboard, a mouse, a pen, a touchscreen, etc.). Upon entry of the second security credential via the second GUI, a determination is made of whether the first and second security credentials match. In some embodiments, if the security credentials do not match, a visual and/or visual cue (e.g., haptic feedback, color change of elements displayed via the GUI etc.) at the second device may be used to indicate the mismatch. In some embodiments, the second security credential may be reentered via the second GUI to make a new determination of whether the security credentials match. Alternatively, and/or additionally, reentry of a second security credential may be prevented after a set number of entry attempts. For example, when the user enters the incorrect pin three times, the user is barred from making a fourth attempt to enter the correct pin.

In various embodiments, the first security credential can be expirable. The expiration can be time based (e.g., the first security credential expires after thirty minutes or some other time interval). The expiration can also or alternatively be use based (e.g., the first security credential expires after one use). After the expiration, the first device can be operated to request and present, via the first GUI, a new security credential.

Other techniques may be possible to send the first security credential from the first device to the second device. For example, based on proximity of the two devices, the first security credential can be sent (e.g., via an NFC tap). Further, a security credential need not be presented at a GUI. Instead, the first GUI may present an option to the first user to authorize the transmission of the first security credential and/or the second GUI may present an option to the second user to access reception of the first security credential.

Figure 9:
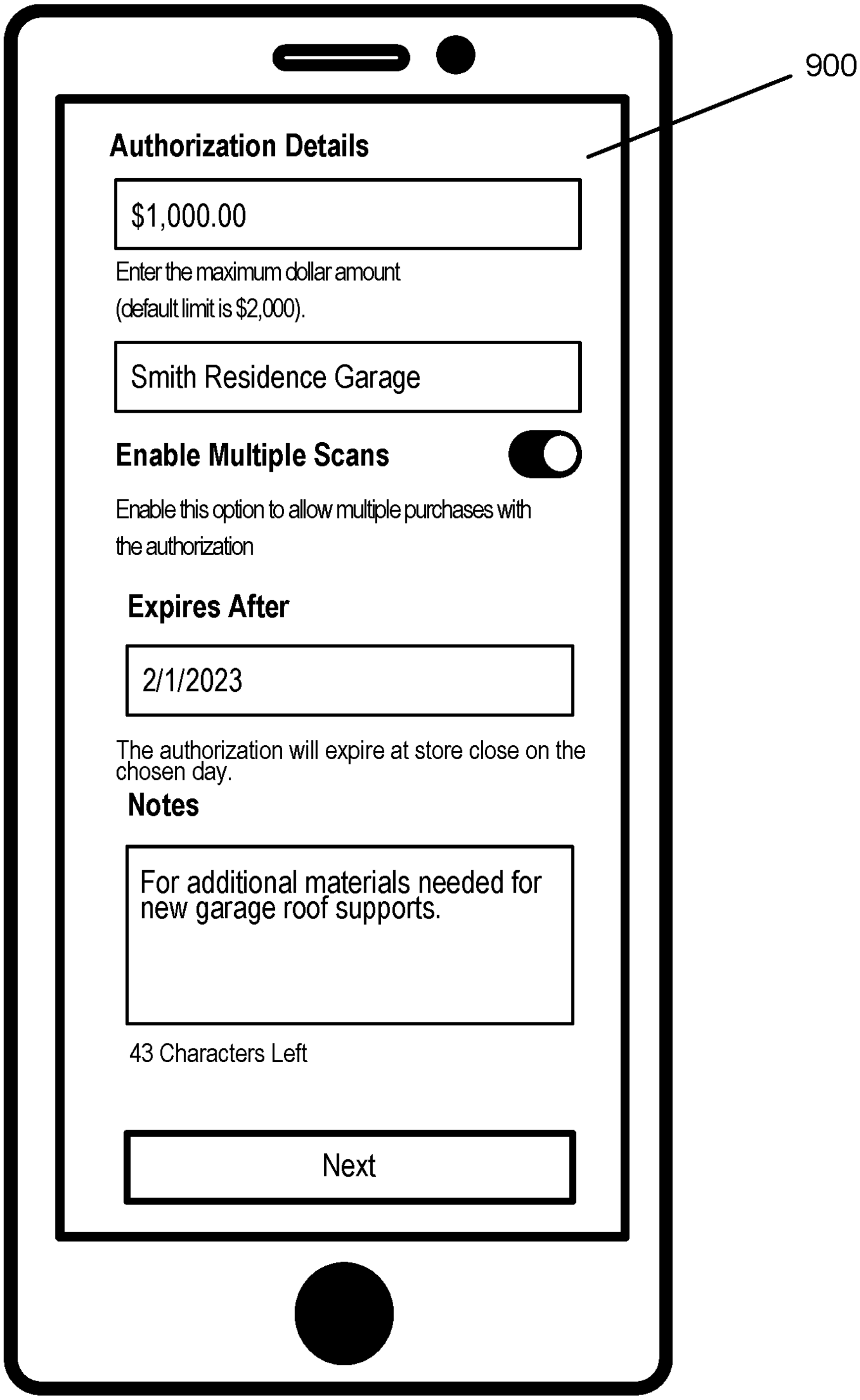
FIG. 9 illustrates an example of a first GUI at a first device enabled for user inputs indicating a set of restrictions for a set of transactions in accordance with at least some embodiments.

FIG. 9 illustrates an example of a first GUI 900 at a first user device 104 enabled for user inputs indicating a set of restrictions for a set of transactions in accordance with at least some embodiments. One or more restrictions may be input via the first GUI 900. In some embodiments, at least one of the restrictions may specify a transaction value, where the transaction value indicates the maximum value for which a payment method associated with the restriction may be used. For example, using the first GUI 900, a value of fifty dollars may be entered as the transaction value, thus, if a user attempts to use a token associated with the transaction value for a purchase that exceeds fifty dollars, the transaction may be rejected. In some embodiments, a default transaction value limit may be set, such that if a transaction value is not input via the first GUI 900, the default transaction value may still apply. For example, if a user does not input a transaction value via the first GUI 900, a default limit of $2,000 may be set as the transaction value.

In some embodiments, at least one of the restrictions may specify the authorization of multiple transactions a payment method associated with the restriction may be used. For example, a user may use the first GUI 900 to enable a payment method to be used for multiple purchases (in which case, a single token can be used for all the purchases, or a different token may be used per purchase). In some embodiments, the number of transactions authorized may be limited by the transaction value. For example, when a user sets a transaction value of $1,000 and enables multiple transactions, a payment method associated with the restrictions may be used multiple times to make purchases, but only up to a limit of $1,000. Alternatively, and/or additionally, the number of transactions authorized may be limited by a number input by a user. For example, a user may use the first GUI 900 to authorize five transactions, therefore, a payment method associated with the restriction may only be used five times.

In some embodiments, at least one of the restrictions may be an expiration date specifying a date on which a payment associated with the restriction may no longer be used to complete transactions. For example, a user may use the first GUI 900 to set an expiration date of five days from the current date, thus six days after the current day a particular user may no longer use a particular payment method associated with the restriction. In some embodiments, the first GUI 900 may include fields to input additional information, such as general notes, a project title, a list of goods to purchase, etc. Such additional information can be processed (e.g., via natural language processing in the case of an unstructured data input, or via a parser in the case of a structured data input) to identify additional restrictions that should be applied.

Figure 10:
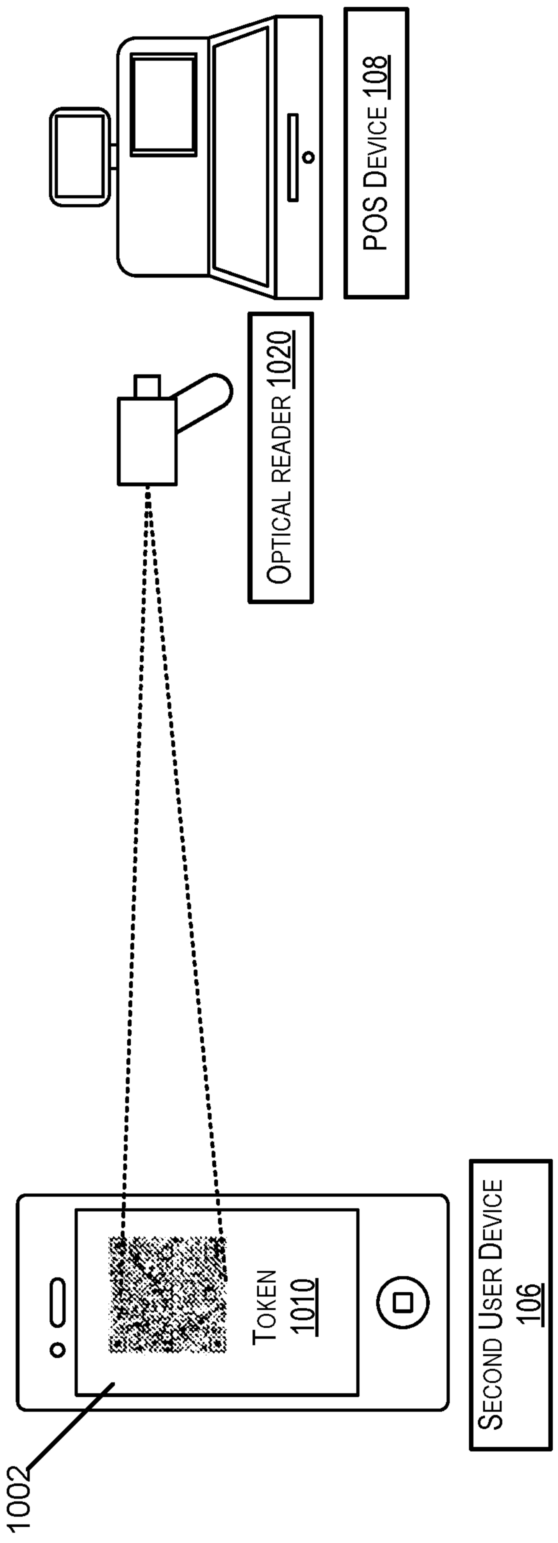
FIG. 10 illustrates an example of using a token as part of an interaction with a POS device in accordance with at least some embodiments.

FIG. 10 illustrates an example of using a token as part of an interaction with a POS device 108 in accordance with at least some embodiments. As illustrated in FIG. 10, a second user may use a second GUI 1002 on a second user device 106 for a transaction (e.g., to purchase a set of items, where the purchase relies on a payment method of a first user account). For example, the second user may present the second user device 106 to an operator of the POS device 108 to purchase items (or directly to the POS device 108, in the use case of self-checkouts). In some embodiments, a token 1010 may be transmitted to the POS device 108 when the second user device 106 is brought into the proximity to the POS device 108. In an example, the token 1010 is presented via the second GUI 1002, and the POS device 108 can scan the token 1010 (whereby this can be performed using an optical reader 1020 of the POS device 108). Other proximity technologies are possible, and the proximity depends on such technologies. For example, in the use case of NFC, an NFC tap of the second user device 106 to a NFC transceiver of the POS device 108 or upon being within a threshold distance that depends on part on the NFC implementation, the token 1010 (or token information thereof) can be transmitted to the POS device 108. In this example, the token 1010 may, but need not, be presented via the second GUI 1002. The second GUI 1002 may present a request to the second user to confirm that the token 1010 can be transmitted.

Once the token 1010 is transmitted to the POS device 108 (or, more specifically, token information scanned or received from the second device), the POS device 108 can determine whether the token 1010 is usable for the transaction. As described herein above, this determination can be remote from the POS device 108, where the POS device sends transaction information and token information to an application server 102 that then sends a positive or negative response. Alternatively, this determination can be local to the POS device 108 based on the application server 102 sending the restriction data to the POS device 108. In both examples, in the case of a positive determination, the POS device 108 can retrieve, from the application server 102 or from a network storage location, and present user data about the first user and/or the second user (e.g., membership status of the first user, username of the second user, etc.).

FIG. 11 illustrates an example of a flow for enabling a second user device to interact with a POS device based on restrictions defined via a first user device in accordance with at least some embodiments. A first GUI on the first device and a second GUI on the second device may be used to enable the second device to interact with the POS device for a purchase on behalf of a first user of the first device. Some or all of the operations of the flow may be performed under the control of one or more servers, such as the application server 102 described herein above, configured with executable instructions and may be implemented as program code (e.g., executable instructions, one or more computer programs, or one or more applications) executing collectively on one or more processors, by hardware or combinations thereof. The program code may be stored on a computer-readable storage medium, for example, in the form of a computer program comprising a plurality of instructions executable by one or more processors. The computer-readable storage medium is non-transitory.

In an example, the flow includes operation 1102, where a set of user inputs, indicating a set of restrictions for using a payment method, are received via the first GUI on the first device associated with a first user account. For example, a user may enter an expiration date and a transaction value using the first GUI. The flow includes operation 1104, where the set of restrictions, including user information (e.g., an identifier of a second user or a second user account for which the payment method is usable subject to other restrictions), a transaction value, and an expiration date, are associated with the first user account. For example, since the user enters the set of restrictions via the first GUI on the first device and the first device is associated with the first user account, the set of restrictions may be associated with the first user account. The flow includes operation 1106 where a first security credential associated with using the payment method is generated. For example, a pin (or some other type of security credential as described herein above) may be generated and associated to using a particular payment method, such as a credit card, of the first user account. The flow includes operation 508, where, based on the user information, an invitation may be transmitted to a second device. The invitation may request at least a second security credential to use the payment method. For example, an invite may be sent (e.g., via SMS text, via push notification, via email, etc.) to the second user's device because the user information indicated the second user, and the second user is determined to be associated with the second device. The flow includes operation 1110, where a second security credential is received from the second device. For instance, the second GUI may be used to input a second security credential, such as a pin, which is then transmitted to the application server. The flow includes operation 1112, where a match between the first and second security credentials is determined. The flow further includes operation 1114, where, based on a match between the first and second security credentials, a token for a transaction is generated where the token is associated with the set of restrictions. The flow further includes operation 1118, where token information of the token sent to the second device is received from a POS device. For example, the second user wishing to make a purchase may present, to the POS device, the token via the second GUI on the second device. The token may then be scanned, where the POS sends the corresponding token information to the application server. The POS device can also send transaction information to the application server. The flow includes operation 1120, where a determination is made, based on the token information, of the applicability of the transaction value and the expiration date to the transaction. For example, the transaction value is determined to be less than the maximum value indicated by the set of restrictions, and the time of the transaction can be determined to be before the expiration of the authorization to use the payment method. The flow includes operation 1122, where a payment method is used for the transaction based on the applicability of the transaction value and the expiration date to the transaction. For example, the transaction server can determine a positive response based on a comparison of transaction information and the set of restrictions. Based on the positive response, the transaction server can trigger the completion of the transaction using the payment method or can send the positive response to the POS device that triggers the completion.

Figure 12:
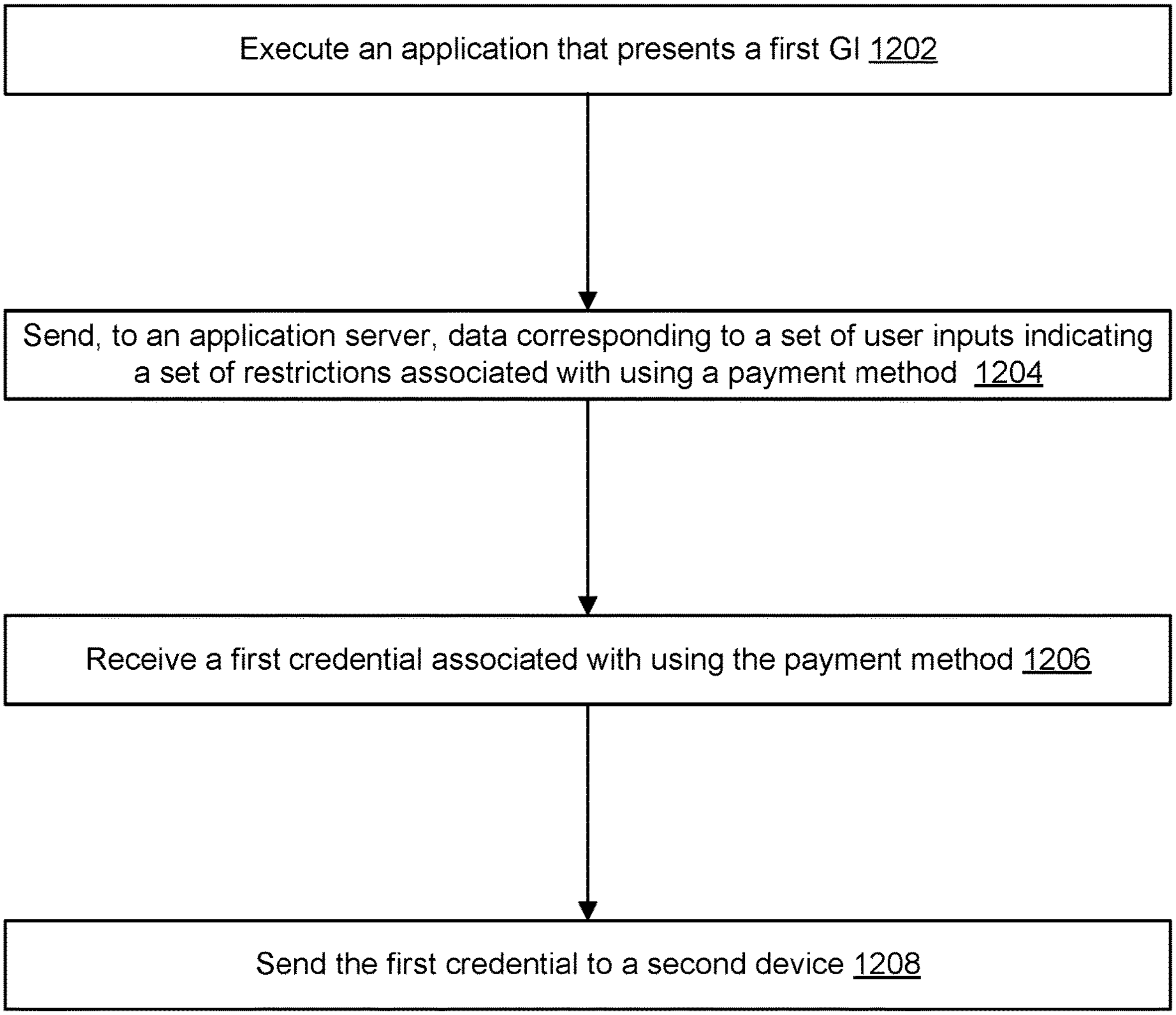
FIG. 12 illustrates an example of a flow for using a first user device to enable a second user device to interact securely with a POS device in accordance with at least some embodiments.

FIG. 12 illustrates an example of a flow for using a first user device to enable a second user device to interact securely with a POS device in accordance with at least some embodiments. Some or all of the operations of the flow may be performed under the control of the first user device, such as the first user device 104 described herein above, configured with executable instructions and may be implemented as program code (e.g., executable instructions, one or more computer programs, or one or more applications) executing collectively on one or more processors, by hardware or combinations thereof. The program code may be stored on a computer-readable storage medium, for example, in the form of a computer program comprising a plurality of instructions executable by one or more processors. The computer-readable storage medium is non-transitory.

The flow includes operation 1202, where the first user device executes an application that presents a first GUI. The first GUI can enable a login to a first user account and user input defining a set of restrictions for using a payment method of the first user account. For example, a user may input an expiration date and a maximum transaction value that apply to the use of the payment method, in addition to identifying a second user to which the payment method is usable subject to the expiration data and transaction value restrictions. The flow includes operation 1204, where data corresponding to the set of user inputs is sent to an application server to associate the first user account with the set of restrictions. Then the flow further includes operation 1206, where a first security credential associated with using the payment method is received. For example, a pin (or a security credential of any other type) may be received from the application server. The flow includes operation 1208, where the first credential is optionally sent to the second user device. For example, different communication media and technologies are possible for this transmission, such short-range or long-range wireless communications.

Figure 13:
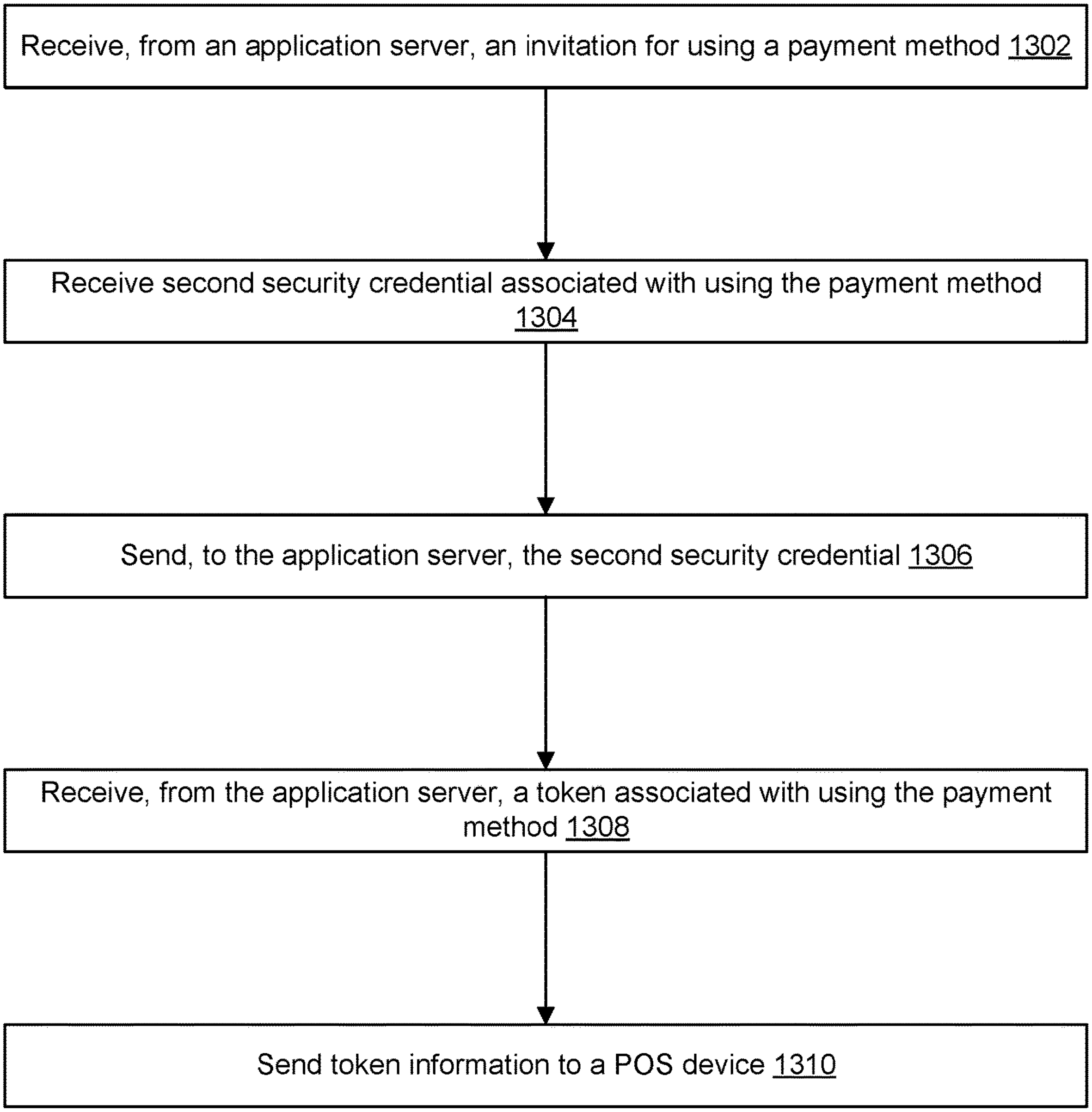
FIG. 13 illustrates an example of a flow for using a second user device to interact with a POS device based on restrictions defined via a first user device in accordance with at least some embodiments.

FIG. 13 illustrates an example of a flow for using a second user device to interact with a POS device based on restrictions defined via a first user device in accordance with at least some embodiments. Some or all of the operations of the flow may be performed under the control of the second user device, such as the second user device 106 described herein above, configured with executable instructions and may be implemented as program code (e.g., executable instructions, one or more computer programs, or one or more applications) executing collectively on one or more processors, by hardware or combinations thereof. The program code may be stored on a computer-readable storage medium, for example, in the form of a computer program comprising a plurality of instructions executable by one or more processors. The computer-readable storage medium is non-transitory.

The flow includes operation 1302, where an invitation is received at a second device, the invitation requesting at least a second security credential to use the payment method. For example, the second device may receive, from an application server, notification data indicating the invitation and requesting the entry of the second security credential to be able to use a payment method associated with a first user account. The flow further includes operation 1304, where a user input indicating the second security credential are received at the second device. For example, a user may use the second GUI at the second device to input a pin in response to receiving the invitation. Alternatively, the security credential can be pre-stored by the device and sent to the application server without the need for user input specifying the information of the second security credential. In this case, user input can be received to authorize the transmission of the second security credential to the application server. The flow also includes operation 1306, where the second security credential is sent to the application server. The flow includes operation 1308, where a token for a transaction is received, the token being generated based on a match of the first and second security credentials. For example, if the first and second security credential are determined by the application server to match, a token may be generated and sent by the application server to the second device. The includes operation 1310, where token information of the token sent to the second device is transmitted from the second device to a POS device. For example, the second device presents the token at the second GUI and the token information can be read by the POS device via a scan. Alternatively, the token need not be presented at the second user device, or even if presented, the token can be transmitted via wireless, optical, or magnetic communications with the POS device based on proximity of the second user device to the POS device.

Figure 14:
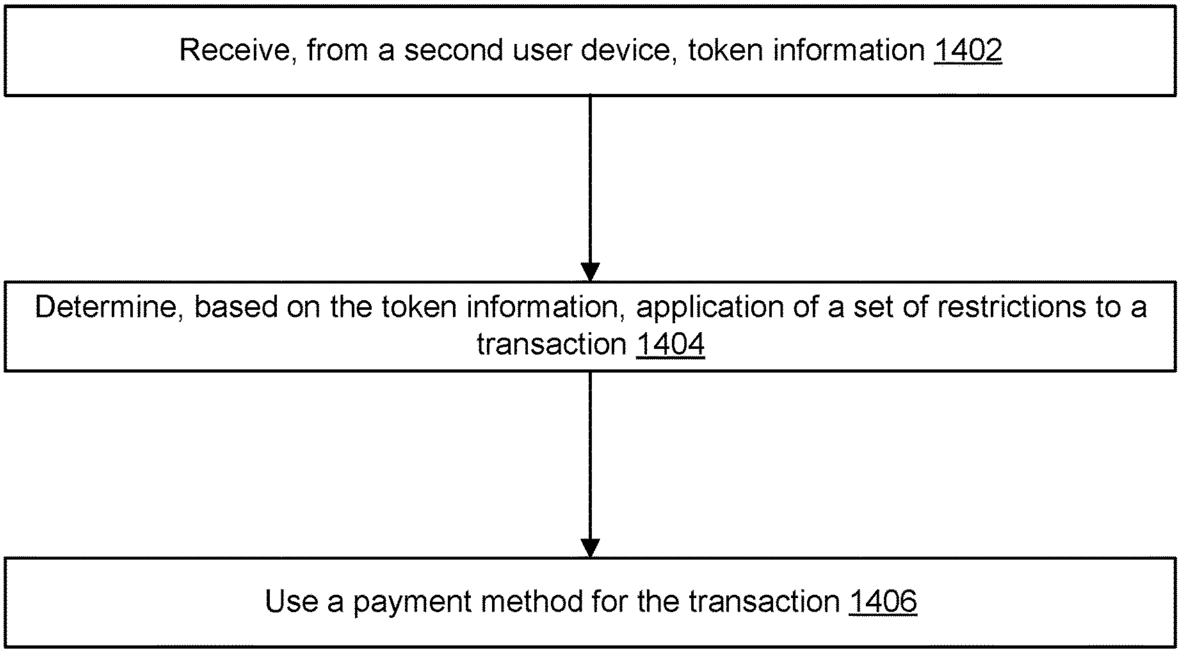
FIG. 14 illustrates an example of a flow for completing a secure transaction at a POS device in accordance with at least some embodiments.

FIG. 14 illustrates an example of a flow for completing a secure transaction at a POS device in accordance with at least some embodiments. Some or all of the operations of the flow may be performed under the control of the POS device, such as the POS device 108 described herein above, configured with executable instructions and may be implemented as program code (e.g., executable instructions, one or more computer programs, or one or more applications) executing collectively on one or more processors, by hardware or combinations thereof. The program code may be stored on a computer-readable storage medium, for example, in the form of a computer program comprising a plurality of instructions executable by one or more processors. The computer-readable storage medium is non-transitory.

The flow includes operation 1402, where the POS device receives, from a second user device, token information of a token for a transaction, where the token is associated with a set of restrictions including user information, a transaction value, and an expiration date. The flow further includes operation 1404, where a determination is made, based on the token information, of the applicability of the transaction value and the expiration date to the transaction. For example, a determination may be made of whether or not the expiration date has already occurred or whether or not the current purchase exceeds the transaction value. This determination can be made locally by the POS device that can retrieve the set of restrictions from the application server based on the token information. Alternatively, this determination includes the POS device sending the token information and transaction information to the application server that then returns a positive response or a negative response. The flow includes operation 1406, where the payment method is used for the transaction based on the applicability of the transaction value and the expiration date to the transaction. For example, if it is determined that the current purchase does not exceed the transaction value, the POS device can be enabled to complete the transaction. Further, the POS device can retrieve and present information about the first user and/or the second user. This information can be retrieved from a network address having a link included in the token information or can be directly retrieved from the token if encoded therein.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method of effecting a transaction and a delegated payment authorization for the transaction, the method comprising:

receiving, by an application server from a first device associated with a first user account, a set of user inputs received by the first device, the set of user inputs indicating a set of restrictions for using a payment method associated with the first user account, the set of restrictions including information for a delegated user authorized to provide the delegated payment authorization, a transaction value restriction for the transaction, and an expiration date restriction for the delegated payment authorization;

associating, by the application server, the first user account with the set of restrictions;

generating, by the application server or the first device, a first security credential associated with using the payment method, wherein the first security credential includes a first value that includes a public key;

transmitting, based on the information for the delegated user and by the application server or the first device, an invitation to a second device, the invitation requesting at least a second security credential to use the payment method;

receiving, by the application server, the second security credential from the second device, wherein the second security credential includes the first value, wherein the first value of the second security credential includes a hash value generated using a private key stored by the second device and a hash function;

determining, by the application server, a match between the first value of the first security credential and the first value of the second security credential, wherein the match indicates authenticity of the second security credential;

generating, based on the match and by the application server, a token for a transaction, wherein the token is associated with the set of restrictions, obfuscates the payment method, encodes token information, is machine readable, and is not user readable;

sending the token to the second device by the application server or the first device;

communicating, from the second device to a point of sale (POS) device, the token information;

receiving, by the application server from the POS device, the token information and transaction information including a transaction value, a transaction date, and an account identifier for an account associated with the POS device;

determining, by the application server, the set of restrictions associated with the token information;

comparing, by the application server, the set of restrictions with the transaction information to determine the transaction value complies with the transaction value restriction and the transaction date complies with the expiration date restriction; and responsive to determining the transaction information complies with the transaction value restriction and the expiration date restriction, settling the transaction using the payment method associated with the first user account.

2. The method of claim 1, wherein a first GUI, via which the set of user inputs is received, is presented on the first device based on an execution of a first instance of a first application, and further comprising:

determining, based on the information for the delegated user, a second user account; and determining the second device based on the second user account, wherein the invitation is transmitted as a link displayable by a messaging application of the second device or by a second instance of the first application executing on the second device.

3. The method of claim 1, wherein the invitation is presented on a second GUI on the second device, wherein the first value is received by the second device via the second GUI, and wherein the second security credential is received by the application server via a network connection to the second device.

4. The method of claim 3, wherein:

the first security credential is expirable; and the second security credential is received prior to expiration of the first security credential.

5. The method of claim 1, wherein a first GUI of the first device includes a field for inputting or selecting the information for the delegated user, a second field for inputting the transaction value restriction, and a third field for inputting the expiration date restriction for the token.

6. The method of claim 1, wherein:

the set of restrictions indicates whether the transaction value is usable for multiple transactions or not;

each transaction corresponds to a scan of the token by the POS device upon a presentation of the token via one or more GUIs; and after determining the transaction information complies with the transaction value restriction and the expiration date restriction, the token is removed from memory of the second device or indicated to be unusable.

7. The method of claim 1, wherein:

the set of restrictions includes a location restriction and the transaction information indicates a transaction location; and comparing the set of restrictions with the transaction information further comprises determining the transaction location complies with the location restriction.

8. The method of claim 1, wherein the set of restrictions and the token are associated with the first user account and stored in a datastore.

9. The method of claim 1, further comprising:

determining, based on the token information, user account data associated with the first user account; and causing a display device associated with the POS device to present the user account data.

10. A system for effecting a transaction and a delegated payment authorization for the transaction, the system comprising:

one or more processors; and one or more memory storing instructions that, upon execution by the one or more processors, configure the system to:

receive a set of user inputs from a first device associated with a first user account, the set of user inputs received by the first device from a first user and indicating a set of restrictions for using a payment method associated with the first user account, the set of restrictions including information for a delegated user authorized to provide the delegated payment authorization, a transaction value restriction for the transaction, and an expiration date restriction for the delegated payment authorization;

associate the first user account with the set of restrictions;

generate a first security credential associated with using the payment method, wherein the first security credential includes a first value that includes a public key;

transmit, based on the information for the delegated user, an invitation to a second device, the invitation requesting at least a second security credential to use the payment method;

receive the second security credential from the second device, wherein the second security credential includes the first value, wherein the first value of the second security credential includes a hash value generated using a private key stored by the second device and a hash function;

determine a match between the first value of the first security credential and the first value of the second security credential, wherein the match indicates authenticity of the second security credential;

generate, based on the match, a token for a transaction, wherein the token is associated with the set of restrictions, obfuscates the payment method, encodes token information, is machine readable, and is not user readable;

send the token to the second device;

receive, from a point of sale (POS) device, the token information and transaction information including a transaction value, a transaction date, and an account identifier for an account associated with the POS device;

determining the set of restrictions associated with the token information;

compare the set of restrictions with the transaction information to determine the transaction value complies with the transaction value restriction and the transaction date complies with the expiration date restriction; and responsive to determining the transaction information complies with the transaction value restriction and the expiration date restriction, settle the transaction using the payment method associated with the first user account.

11. The system of claim 10, wherein the execution of the instructions further configures the system to:

determine, based on the information for the delegated user, a second user account; and determine the second device based on the second user account.

12. The system of claim 10, wherein the first value is sent to the first device.

13. The system of claim 12, wherein the first security credential is expirable, and wherein the second security credential is received prior to expiration of the first security credential.

14. One or more non-transitory computer-readable storage media storing instructions that, upon execution by a system, cause the system to effect a transaction and a delegated payment authorization for the transaction by performing operations comprising:

receiving, from a first device associated with a first user account, a set of user inputs received by the first device, the set of user inputs indicating a set of restrictions for using a payment method associated with the first user account, the set of restrictions including information for a delegated user authorized to provide the delegated payment authorization, a transaction value restriction for the transaction, and an expiration date restriction for the delegated payment authorization;

associating the first user account with the set of restrictions;

generating a first security credential associated with using the payment method, wherein the first security credential includes a first value that includes a public key;

transmitting, based on the information for the delegated user, an invitation to a second device, the invitation requesting at least a second security credential to use the payment method;

receiving the second security credential from the second device, wherein the second security credential includes the first value, wherein the first value of the second security credential includes a hash value generated using a private key stored by the second device and a hash function;

determining a match between the first value of the first security credential and the first value of the second security credential, wherein the match indicates authenticity of the second security credential;

generating, based on the match, a token for a transaction, wherein the token is associated with the set of restrictions, obfuscates the payment method, encodes token information, is machine readable, and is not user readable;

sending the token to the second device;

receiving, from a point of sale (POS) device, the token information and transaction information including a transaction value, a transaction date, and an account identifier for an account associated with the POS device;

determining the set of restrictions associated with the token information;

comparing the set of restrictions with the transaction information to determine the transaction value complies with the transaction value restriction and the transaction date complies with the expiration date restriction; and responsive to determining the transaction information complies with the transaction value restriction and the expiration date restriction, settling the transaction using the payment method associated with the first user account.

15. The one or more non-transitory computer-readable storage media of claim 14, wherein first GUI of the first device includes a field for inputting or selecting the information for the delegated user, a second field for inputting the transaction value restriction for the transaction, and a third field for inputting the expiration date restriction for the delegated payment authorization.

16. The one or more non-transitory computer-readable storage media of claim 14, wherein the set of restrictions further indicate whether the transaction value is usable for multiple transactions.

17. The one or more non-transitory computer-readable storage media of claim 14, wherein the token information includes one or more links to the first user account and the set of restrictions.

* * * * *